US010237511B2

(12) United States Patent
Garing et al.

(10) Patent No.: US 10,237,511 B2
(45) Date of Patent: Mar. 19, 2019

(54) PROJECTION INFORMATION DISPLAY

(71) Applicant: B/E Aerospace, Inc., Wellington, FL (US)

(72) Inventors: Francis Xavier L. Garing, Atlanta, GA (US); Benjamin Stephens, Atlanta, GA (US); Suzuko Hisata, Atlanta, GA (US); Jae Hun Gu, Atlanta, GA (US); Alyssa G. Mellett, Kennesaw, GA (US); Alexander Nicholas Pozzi, Winston-Salem, NC (US); Robert J. Henshaw, Newnan, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/477,073

(22) Filed: Apr. 1, 2017

(65) Prior Publication Data
US 2017/0289494 A1    Oct. 5, 2017

Related U.S. Application Data

(60) Provisional application No. 62/316,894, filed on Apr. 1, 2016, provisional application No. 62/317,080, filed on Apr. 1, 2016.

(51) Int. Cl.
| G09G 5/00 | (2006.01) |
| H04N 5/74 | (2006.01) |
| B64D 11/00 | (2006.01) |
| G06F 1/16 | (2006.01) |
| G06F 3/0481 | (2013.01) |
| G06F 3/0484 | (2013.01) |
| G09G 3/00 | (2006.01) |
| G09G 3/32 | (2016.01) |
| H04N 9/31 | (2006.01) |

(52) U.S. Cl.
CPC ....... H04N 5/7408 (2013.01); B64D 11/0015 (2013.01); G06F 1/1639 (2013.01);
(Continued)

(58) Field of Classification Search
USPC .................. 345/156, 173, 174, 158; 725/77; 307/91; 397/174 R; 244/122 R;
(Continued)

(56) References Cited

U.S. PATENT DOCUMENTS

2008/0136839 A1* 6/2008 Franko ............... B64D 11/0015
345/634
2009/0288123 A1* 11/2009 Havlovick ......... B64D 11/0015
725/77
(Continued)

Primary Examiner — Thuy N Pardo
(74) Attorney, Agent, or Firm — Clements Bernard Walker PLLC

(57) ABSTRACT

In an illustrative embodiment, systems and methods for controlling projection of graphical elements onto surfaces of an aircraft cabin interior may include a projector mounted to a surface of a static element of an aircraft passenger suite that outputs the graphical element onto a projection surface. The graphical element may correspond to a received projection request. A controller may receive a projection request from a computing device indicating a type of graphical element for display onto the projection surface. The type of graphical element may correspond to a type of communication message such as a message between a passenger and a flight attendant within the aircraft cabin. The graphical element may generated for display by the projector based on at least one of the type of graphical element associated with the received projection request and a native language of the passenger or flight attendant.

18 Claims, 15 Drawing Sheets

(52) U.S. Cl.
CPC ........ *G06F 3/0481* (2013.01); *G06F 3/04842* (2013.01); *G09G 3/002* (2013.01); *G09G 3/32* (2013.01); *H04N 9/31* (2013.01); *H04N 9/3141* (2013.01); *G09G 2354/00* (2013.01); *G09G 2380/12* (2013.01)

(58) Field of Classification Search
USPC .................... 297/174 R; 726/11; 704/201
See application file for complete search history.

(56) References Cited

U.S. PATENT DOCUMENTS

| | | | | |
|---|---|---|---|---|
| 2012/0292986 | A1* | 11/2012 | Riedel .................... | B64D 11/00 307/9.1 |
| 2014/0304801 | A1* | 10/2014 | Kauffman ............ | G08G 5/0013 726/11 |
| 2014/0361585 | A1* | 12/2014 | Henshaw ................. | B60N 2/01 297/174 R |
| 2016/0196832 | A1* | 7/2016 | Maxon .................... | G10L 21/00 704/201 |
| 2016/0297530 | A1* | 10/2016 | Simeon .................... | B61D 1/04 345/156 |
| 2016/0298370 | A1* | 10/2016 | Druckman ......... | B64D 11/0606 345/158 |
| 2017/0029113 | A1* | 2/2017 | Freund ............... | B64D 11/0015 345/156 |
| 2017/0064067 | A1* | 3/2017 | Hockenberry .... | H04M 1/72533 345/156 |
| 2017/0233057 | A1* | 8/2017 | Charles .............. | B64D 11/0601 244/122 R |
| 2017/0283079 | A1* | 10/2017 | Meadows ............. | B64D 25/06 345/173 |

\* cited by examiner

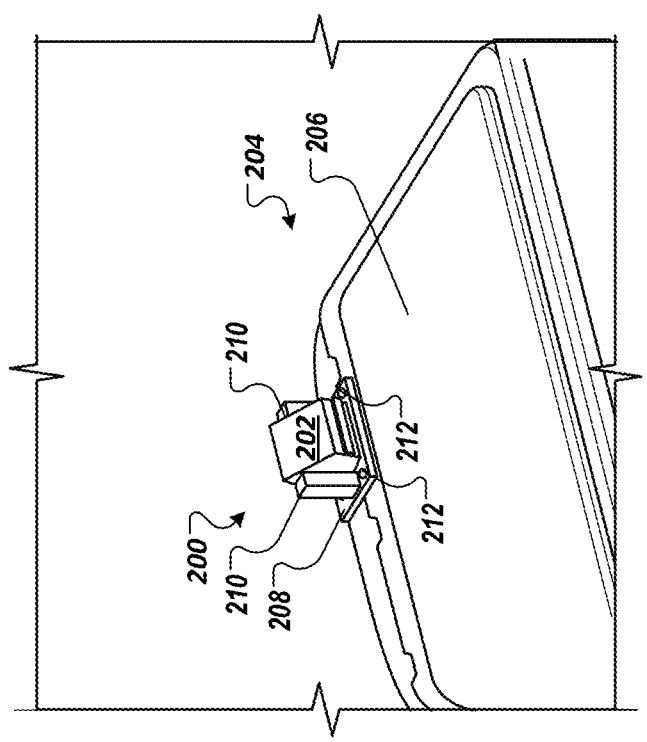

PROJECTION INFORMATION DISPLAY

RELATED APPLICATIONS

This application claims priority to U.S. Provisional Patent Application Ser. No. 62/317,080, entitled "Projection Information Display," filed Apr. 1, 2016 and hereby incorporated by reference in its entirety. This application also claims priority to U.S. Provisional Application Ser. No. 62/316,894, entitled "Activity-Sensing Table for an Aircraft Passenger-Seating Unit," filed Apr. 1, 2016 and hereby incorporated by reference in its entirety. This application incorporates by reference in its entirety the following application by B/E Aerospace, Inc. directed to use of video or image projectors in aircraft: U.S. patent application Ser. No. 15/092,924 entitled "Privacy Divider with Video Monitor Function for Vehicle Passenger Seating Unit" and filed Apr. 7, 2016.

BACKGROUND

Airliner cabin layouts including business and premium class seating typically include a number of individual passenger suites that are typically defined by partition walls and may include lie-flat capable seats, video monitors, stowage compartments, working tables, etc. Passengers that pay a premium for these suites expect a certain degree of privacy and premium service once aboard and during flight.

However, the privacy afforded by the partition walls and other features of the suites may make communication between flight attendants and passengers more difficult, which can degrade the level of service provided to the premium class passengers. For example, when aisle-side doors to the passenger suites are closed, the flight attendant and passenger may not be able to easily gain the attention of one another and/or conduct a conversation. In addition, passengers may be hesitant to ring flight attendant call bells that create noise throughout the aircraft cabin and may disturb other passengers.

In addition, various types of information are often communicated between passengers and flight attendants both verbally and non-verbally on a regular basis throughout a flight. Non-verbal communications may be a passenger's body language indicating that the passenger is asleep, awake, watching a movie, eating a meal and/or drinking a beverage, finishing a meal, etc. In addition, passengers may verbally request food, beverage, or other items from the flight attendants, and the passengers may be provided information regarding gate information for subsequent flights, baggage claim carousel number at the arrival airport, customs regulations, etc. In some instances, particularly during international flights, language barriers may exist between flight attendants and passengers, making verbal communication more difficult.

SUMMARY OF ILLUSTRATIVE EMBODIMENTS

In certain embodiments, systems and methods for controlling projection of graphical elements onto surfaces of an aircraft cabin interior include a projector mounted to a surface of a static element that outputs the graphical element onto a projection surface that corresponds to a received projection request. The static element, for example, may include a partition of a passenger suite or apparatus installed within a passenger suite. The projection surface, in some examples, may include a region surrounding a threshold of an entrance of the passenger suite, an exterior partition surface of the passenger suite, or an interior partition surface of the passenger suite.

In certain embodiments, a controller may receive a projection request from a computing device indicating a type of graphical element for display onto a projection surface and cause display of the graphical element. The projection request may correspond to a type of communication message, for example between a passenger and a flight attendant within the aircraft cabin. A status of the passenger within a passenger suite may be determined based on sensor data received from sensors within the passenger suite such that projection is suppressed while the passenger is asleep or away from the passenger suite. The graphical element may be generated for display by the projector based on at least one of the type of graphical element associated with the received projection request and a native language of the passenger or flight attendant.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 2 illustrates a perspective view of a projector mounted to a surface within an aircraft cabin;

DETAILED DESCRIPTION OF ILLUSTRATIVE EMBODIMENTS

Figure 1A:
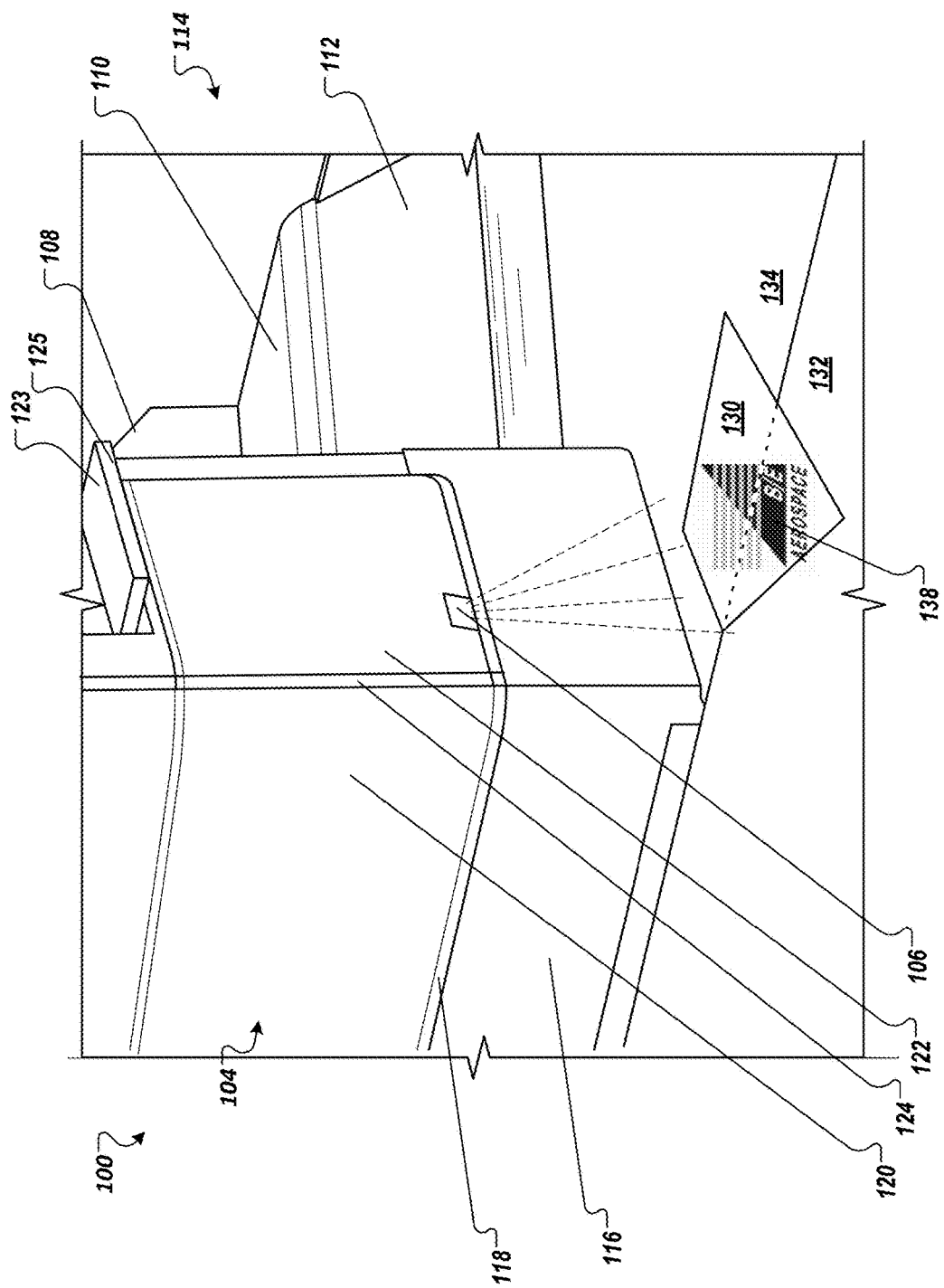
FIG. 1A illustrates an aisle-side perspective view of a portion of a passenger suite including a projector mounted within a static element.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

In an illustrative embodiment, an information display system may utilize a compact projector to dynamically display information to an aircraft passenger and/or aircraft flight crew. The compact projector can be mounted into a static element of the seat structure or passenger suite environment. The compact projector may be configured to project information onto an adjacent floor area that can be viewed by both the passenger and the flight attendant. In some implementations, control of the projector can be achieved through existing user interface screens and seat control systems and may display information such as attendant call requests, do not disturb notifications, exit path directions, welcome messages, etc. In addition, in some implementations, flight attendants may also control the projector through an input/output (I/O) device to communicate information to the passenger.

Certain aspects of the present disclosure may be directed to displaying information to an airline passenger and/or flight crew, and more particularly, to an information display system that utilizes a compact projector to dynamically project information onto the adjacent floor area or other structure where the projection can be viewed by both the passenger and flight crew. Prior to departure, during flight and in preparation for landing, it is necessary for the flight crew to convey information to the passengers, such as sitting position requirements, tray table and device stowage, arrival times, etc. It is also common during flight for passengers to require attention from the flight crew, such as food and beverage requests, bedding, media, etc. In order to provide privacy to passengers while still being able to convey necessary information, a projection system may be provided for conveying information back and forth between a passenger in an enclosed suite and the flight crew.

Certain aspects of the present disclosure may also be directed to detecting a status of a passenger within a passenger suite of an aircraft cabin based on sensor data received from various types of sensors installed within the passenger suite. The sensors may include motion sensors, pressure sensors, contact sensors, accelerometers, etc. In some implementations, the sensor data may be used to determine whether the passenger is awake or asleep, inside or outside the passenger suite, eating a meal and/or drinking a beverage, finished with a meal and/or beverage, performing work activities (e.g., typing on a laptop, writing on a notepad), or watching a movie. In some implementations, the information display system may automatically display information to the passenger and/or flight attendant utilizing the projector in response to determining a sensed status of the passenger within the suite. In addition, the information display system may also select a projection surface for the information based on the sensed status of the passenger.

Figure 1B:
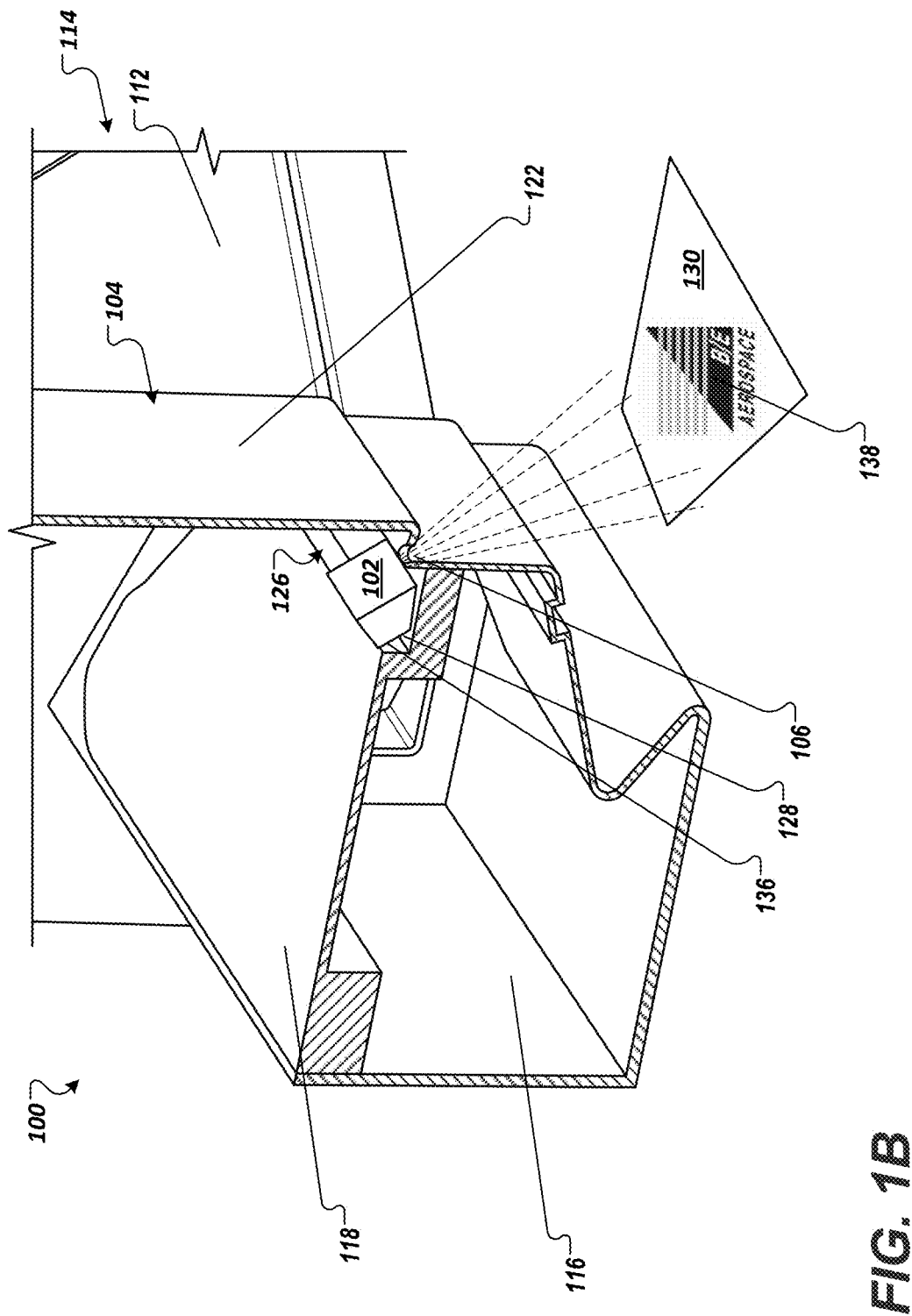
FIG. 1B illustrates a sectional view of a static element of a passenger suite that includes a projector mounted within the static element.

Turning to the figures, FIGS. 1A-1B illustrate perspectives views of a portion of a passenger suite 100 including a projector 102 included within a static element 104 of the passenger suite 100. For example, FIG. 1A is an aisle-side perspective view of the passenger suite 100 illustrating an aperture 106 for the projector 102 disposed on a surface of the static element 104 through which the projector 102 projects a graphical element 138 onto a projection surface 130. The graphical element 138 may include messages exchanged between the passenger within the suite 100 and a flight attendant, branding/product logos, advertising indicia, passenger information, etc.

In some embodiments, the projector 102 may be housed within an interior of the static element 104. In FIG. 1A, the static element 104 is an aisle-side console for the passenger suite 102 that may function as a boundary between an aisle of the aircraft cabin and an interior of the passenger suite 100. For example, side surface 120 of the static element 104 provides an aisle-side boundary between the aisle and the passenger suite 100.

In addition, the static element 104 may also provide other functions which may include storing objects within the interior of the static element 104 and providing a working surface 123 that is part of a table 125 that folds out into the passenger suite 100 from a front surface of the static element 104. In some implementations, the table 125 may include one or more sensors embedded within a substantially hollow interior of the table that may detect various types of activities that may be occurring on the working surface 123. For example, the table 125 may include one or more inertial sensors connected to a sensor board between the working (upper) surface 123 of the table 125 and a lower surface of the table 125 that has sufficient sensitivity to detect activities such as placing objects onto or removing objects from the working surface 123, moving objects on the working surface 123, impact transmitted from a laptop keyboard through the laptop to the table 125 or manipulation of the table 125 itself.

In some implementations, the static element 104 is located adjacent to an adjustable seat 114 such that a passenger seated in the seat 114 is able to view the graphical element 138 displayed on the projection surface 130 from a seated or lie-flat position in the seat 114. The seat 114 may include a wall 108, a bed extension 110, and a footrest 112. These structures cooperate with the remainder of the suite assembly (for example, as depicted in FIG. 3D).

In some embodiments, the static element 104 may be mounted onto a base 116, which is in turn mounted to a floor surface where a first floor portion 134 of the passenger suite 100 meets a second floor portion 132 of an aisle of the aircraft cabin. In one example where the projector 102 connects onto or proximate to a bottom surface 118 of the static element 104, the base 116 provides a projection height for the aperture 106 that corresponds to a predetermined area for the projection surface 130. In some implementations, the predetermined area for the projection surface 130 is based on viewing ranges for a person with average vision viewing the projection surface from a distance corresponding to a distance between the projection surface 130 and the seat 114. In addition, a lateral position of the aperture 106 on the front surface 122 of the static element 104 allows the projection surface 130 to be displayed onto both the first floor portion 134 of the passenger suite 100 and the second floor portion 132 of the aisle simultaneously. Including both the first and second floor portions 132, 134 within the projection surface 130 allows both the passenger and personnel within the aisle of the aircraft (e.g., flight attendants) to view the graphical element 138 displayed within the projection surface 130.

In addition, the height of the base 116 may be designed such that a height of the lower surface 118 of the static element 104 corresponds to a height of a lower surface of a door 405 (FIG. 4) that translates to a closed position by extending across the ingress/egress path of the passenger suite 100 to make contact with a front edge 124 of the static element 104. The height of the base 116 creates a gap between a lower surface of the door 405 and the floor portions 132, 134, such that the projection surface 130 is positioned underneath the lower surface of the door 405.

FIG. 1B illustrates an aisle-side sectional view of the static element 104 of the passenger suite 100 adjacent to the footrest 112 of seat 114 that shows the projector 102 housed within an interior portion of the static element 104 that is configured to display a graphical element 138 onto the projection surface 130 through an aperture 106 disposed within a front surface 122 of the static element 104. In a preferred embodiment, base 116 is positioned below the seat (note shown) of the next passenger suite and projector 102 is positioned behind the seat (not shown) of the next passenger suite. This configuration advantageously utilizes otherwise unused space behind the seat of each passenger suite.

In the example shown in FIG. 1B, the static element 104 includes a lower surface 118 that forms a boundary between the static element 104 and base 116 connecting the static element 104 to the first portion of the floor 132 of the passenger suite 100. In some implementations, the base 116 is integrated into the structure of the static element 104 at the lower surface 118 such that the static element 104 and base 118 form a single module of furniture within the passenger suite 100. In one example, the aperture 106 may be hole formed in the front surface 122 of the static element at a connection surface where the static element 104 meets the base 116, proximate the lower surface 118 of the static element 104 in one example.

In some implementations, the projector 102 may be mounted within a groove or ledge 126 within the lower surface 118 that allows the projector 102 to be mounted to the static element 104 with an orientation that allows the projection to pass through the aperture 106 in an outward and downward direction to display the graphical element 138 on the projection surface 130. For example, the ledge 126 is located at a forward end of the static element between the lower surface 118 and the front surface 122 such that the projector 102 is secured between the front surface 122 and lower surface of the static element 104. In some implementations, a width and height of the ledge 126 may be based on dimensions of the projector 102 such that ledge 126 is configured to snuggly hold the projector 102 at a predetermined projection angle within the ledge 126. In some implementations, the projector 102 may be mounted to one or more surfaces of the ledge 126 including at least one of a lower surface 128 and a rear surface 136 of the ledge 126. The projector 102 may be mounted to the one or more surfaces of the ledge 126 via any type of connectors such as screws, bolts, nuts, fasteners, etc., and may also be mounted to the ledge via a mounting assembly 200 (FIG. 2).

Because the projector 102 is located within the static element 104, the projector 102 may be out of the way of harm that may be caused due to bumping or knocking of the projector 102 by personnel or luggage and may also be inaccessible to the passenger. The projector 102 may be preferably compact and light as to not add substantial weight to the aircraft and fit onto and/or within small mounting spaces within the aircraft cabin such as the ledge 126 within the interior of the static element 104. For example, the projector 102 may be a pico projector (also referred to as a pocket projector, handheld projector, mobile projector, or mini beamer) that includes miniaturized hardware and software that can project digital images onto nearby viewing surfaces, such as the projection surface 130. Use of a pico projector may provide the additional advantage that it is low power and thus generates a small amount of heat. That is particularly useful in the depicted embodiment, in which the projector is positioned behind the seat of the next passenger suit, which may provide little air circulation to provide cooling. Low-power projectors are also particularly useful if the projector 102 is covered by a protective shroud or fabric cover, in which case it may be necessary to limit the amount of heat generated by the projector.

In examples where a mounting surface for the projector 102 is large and/or an area of the projection surface 130 for the graphical element 138 is greater than the area of the projection surface 130 that is able to be projected by a pico projector, larger-sized projectors may be used. In such embodiments, a heat sink and/or convective cooling conduits may be provided to scavenge heat from the projector. Alternatively, forced-air cooling mechanisms such as low power fans may be used.

The projector 102 may employ digital light processing (DLP), liquid crystal display (LCD), or light emitting diode (LED) projection technology. In some examples, DLP projectors include a DLP chip (referred to as a digital micromirror device, or DMD) composed of millions of miniature mirrors that can be independently adjusted to move toward or away from a light source to produce dark or light pixels. Beams of light that are fed to the DMD pass through a spinning color wheel to generate color prior to reaching the DMD chip. Once the colored light beams reach the DMD chip, the projected image passes through a lens and onto the projection surface 130.

In some implementations, DLP projectors may have fewer maintenance requirements than projectors that use other projection technologies because DLP projectors may be filter-free and have a sealed chip design such that dust is unable to settle on the DMD chip to cause image spots and may be installed in locations within the passenger suite 100 that are less easily accessible due to the reduced maintenance requirements. In addition, DLP projectors may also be immune to color decay and are not susceptible to misalignments that may occur in LCD projectors with a three-panel design that rely on each panel to be in a precise position to combine the image at a proper angle. However, DLP projectors with slow-spinning color wheels may give off a rainbow effect, which is when unwanted bright flashes of color appear on the projection surface 130. In addition, although the DMD chip is sealed, other components within a DLP projector are not sealed so dust can collect on the color wheel, which can degrade image quality. DLP projectors may also have a poor viewing range compared to other projector technologies and may be used in applications where the distance between the aperture 106 for the projector 102 and the projection surface 130 is relatively short.

In some implementations, LCD projectors use three LCDs to generate the graphical element 138 displayed on the projection surface 130. Specifically, beams of light are passed to three dichroic mirrors that are specifically shaped to reflect predetermined wavelengths of light (e.g., red, green, blue) such that the projected images generated by each of the three LCDs correspond to each of three colors based on a received control signal that includes image information for the graphical element 138. The images generated by each of the three LCDs are collected at a prism to generated the graphical element 138 displayed on the projection surface 130.

In some examples, LCD projectors tend to be more reliable than other projector technologies but may have more maintenance requirements than DLP projectors due to burned out pixels and dust particles that can interfere with image quality. On the other hand, LCD projectors have no moving parts like the spinning color wheel of the DLP projector and tend to be less expensive than DLP projectors. In addition, LCD projectors have a greater projection range than DLP projectors and may be used in applications with longer distances between the aperture 106 for the projector 102 and the projection surface 130.

LED projectors are defined by the type of lighting used in the projector rather than the actual display technology. For example, some DLP projectors may also be LED projectors that include a DMD chip with LED light sources. In some pico projector implementations, LEDs may be employed in conjunction with liquid crystal on silicon (LCoS) panels that are similar to LCDs but are reflective rather than transmissive. In such pico projector implementations, colored LEDs replace both traditional lamps and the color wheel that is typically used in DLP projectors, and the colored LEDs transmit light directly onto the DMD chip.

In some implementations, LEDs in LED projectors have much longer lives than traditional projector lamps. For example, LEDs may be rated on scales form approximately 10,000 to 20,000 hours as opposed to scales of 1,000 to 5,000 hours for traditional projector lamps. As such, the LED light sources are meant to last for an entire lifetime of the projector without having to be replaced. In addition, LEDs do not have a warm-up or cool-down period like traditional projector lamps and are also more energy-efficient and quieter, which reduces maintenance and operating costs. However, pico projectors that use LED technologies may have lower brightness levels than larger projectors or projectors that use other types of light sources.

FIG. 2 is a zoomed in perspective view of from the passenger suite positioned forwardly of the passenger suite shown in FIG. 1A with the passenger seat removed. The projector 202 is mounted behind the seat of the forward passenger suite. Mounting assembly 200 for a projector 202 is mounted to a surface 206 of a static element 204 within an aircraft cabin is illustrated. In some implementations, the surface 206 of the static element 204 may be the lower surface 118 within the interior of the static element 104 (FIGS. 1A-1B).

In other embodiments, the surface 206 of the static element 204 may also be any other surface within an interior of the aircraft cabin to which the mounting assembly 200 can be connected such that the projector 202 projects a graphical element onto a desired projection surface. For example, the static element 204 can be a tabletop, top of a stowage compartment, the bottom on an overhead bin storage compartment, the edge of an ottoman, or any other surface within a passenger suite or outside of the passenger suite.

In an illustrative example shown in FIG. 3D, the projector 202 can be mounted to a surface of a suite across an aisle from the suite 300, and is configured to project a graphical element 338 onto a projection area 330*d* of an outer surface 320 of a static element 304 that forms an aisle-side boundary of the suite 300.

Referring back to FIG. 2, In some implementations, the mounting assembly 200 generally includes a flat mounting plate 208 with posts 210 extending in an upward direction from the mounting plate 208. Fasteners 212 can be received through the mounting plate 208 and/or posts 210 to secure the mounting assembly 300 to the surface 206 of the static element 204. The posts 210 may have a length substantially equal to a height of the projector 206. The distance between the posts 210 on the mounting plate 208 may be based on dimensions such that the projector 202 is configured to fit between the posts 210 and connect to the posts 210. In some implementations, the projector 202 is configured to rotate about axes created at connection points (not shown) between the posts 210 and the projector 202 to provide for adjusting an orientation angle or location of the projection surface 130 (FIG. 1). For example, the projector 202 may be rotated in upward and downward directions. The mounting assembly 200 may also include other post configurations to provide for both horizontal and vertical rotation of the projector 202.

In some implementations, the posts 210 may include remotely controlled rotational actuators that are configured to rotate the projector 202 about the connection points with the posts 210 in order to modify the orientation angle of the projector 202 in response to a control signal received from a controller of a computing system. Wiring/cabling associated with supplying power to the projector 202, transmitting data/receiving data, and controlling the rotation of the projector 202 can be routed and maintained within stowage compartments below the surface 206 or at other locations proximate the projector 202. In some implementations, the projector 202 may be connected to the computing system that controls the angle of rotation of the projector 202 and transmits data with information regarding the graphical element displayed on the projection surface 130 (FIG. 1) through a wired or wireless network, such as a Wi-Fi, Bluetooth, Zigbee, or Ultra Wide Band (UWB) network.

Turning to FIGS. 3A-3D, perspective views of an aircraft passenger suite 300 are illustrated with a graphical element 338 projected onto various surfaces of the passenger suite 300 by a projector mounted at various locations within the passenger suite 300 or aircraft cabin and configured to display a graphical element 338 onto various projection surfaces 330 throughout the passenger suite 300. The passenger suite 300 may include a single projector or multiple projectors mounted to multiple locations inside or outside the suite 300 that are configured to output graphical elements 338 onto projection surfaces 330 of the suite 300.

The passenger suite 300 includes a variety of partition walls, compartments, and surfaces to which a projector, such as the projector 202 (FIG. 2) described above may be mounted. For example, the suite 300 may include surfaces such as a forward partition wall 340 that functions as a boundary between the suite 300 and an adjacent suite that is forward of the suite 300, an upper surface 342 of an aisle-side console 304, an upper surface of a monitor 346 for an input/output (I/O) device, a surface of a rear partition wall 352 that functions as a boundary between the suite 300 and an adjacent suite to the rear of the suite 300, an upper edge 321 of the side surface 320 of the side console 304, an upper surface 350 of a slidable privacy door panel 356 with a handle 354, working surface 344 to the right of seat 314, a lower storage surface 348 below the working surface 344 near the feet of the passenger, as well as many other surfaces to which the projector 202 may be mounted. In a preferred embodiment panel 320 is the slideable privacy door of the next suite forward of suite 300 and the region bordered by the panel 320 and the wall 340 receives the passenger seat of the next suite.

Figure 3A:
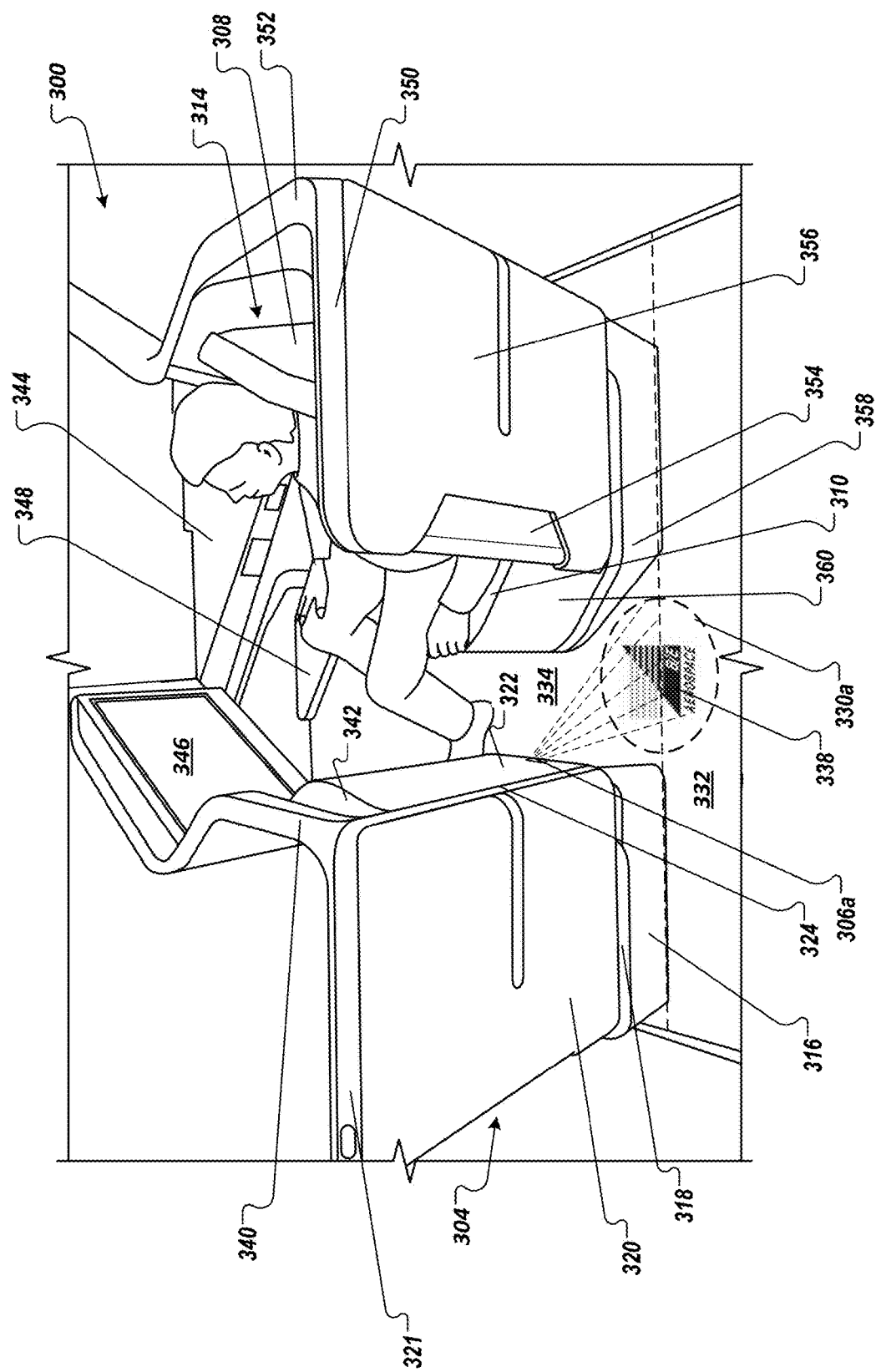
FIGS. 3A-3D illustrate aisle-side perspective views of a passenger suite including a projector mounted at various locations within the suite.

FIG. 3A illustrates an example of a projector mounted to a lower surface 318 within an interior of the aisle-side console 304 and includes aperture 306a disposed on the front surface of the console 304 similarly to the projector 102 (FIG. 1) described above. In some implementations, the console 304 is located adjacent to an adjustable seat 314 such that a passenger seated in the seat 314 may view the graphical element 338 displayed onto the projection surface 330a from a seated or lie-flat position in the seat 314.

In some examples, the console 304 may be mounted onto a base 316, which is in turn mounted to a floor surface where a first floor portion 334 of the passenger suite 300 meets a second floor portion 332 of an aisle of the aircraft cabin. In one example where the projector connects onto or proximate to a bottom surface 318 of the console 304, the base 316 provides a projection height for the aperture 306a that corresponds to a predetermined area for the projection surface 330a. In some implementations, the predetermined area for the projection surface 330a is based on viewing ranges for a person with average vision viewing the projection surface from a distance corresponding to a distance between the projection surface 330a and the seat 314. In addition, a lateral position of the aperture 306a on the front surface 322 of the console 304 allows the projection surface 330a to be displayed onto both the first floor portion 334 of the passenger suite 300 and the second floor portion 332 of the aisle simultaneously. Including both the first and second floor portions 332, 334 within the projection surface 330 allows both the passenger and personnel within the aisle of the aircraft (e.g., flight attendants) to view the graphical element 338 displayed within the projection surface 330a.

In some implementations, the projector mounted within the interior of the console 304 that projects the graphical element 338 through aperture 306a onto projection area 330a that includes both the first and second floor portions 332, 334 can be used for communications between the passenger within the suite 300 and the flight attendant when a door 405 (FIG. 4) is closed across an ingress/egress path of the suite 300 and/or for communications that are of interest to both the flight attendants and the passenger, such as requests for service from the passenger and acknowledgements of requests for service from the flight attendant.

In some examples, the graphical element 338 shown in the projection area 330 in FIGS. 3A-3D contains information conveyed by the flight crew to the passenger and/or information conveyed by the passenger to the flight crew. The information can contain text information and/or communicative icons, such as a do not disturb icon. The projection, in some implementations, is presenting in a color tone easily distinguishable upon the projection area 330. In other implementations, the projections may be multi-colored, or color coded to convey certain types of information (e.g., requests for food or beverages, reports of problems, requests for relaxation accessories, etc.). In some examples, the graphical element 338 may include animated objects and/or movies that are displayed on the projection surface 330.
Notifications In addition, the height of the base 316 of the console 304 may be designed such that a height of the lower surface 318 of the console 304 corresponds to a height of a lower surface of a door 405 (FIG. 4) that translates to a closed position by extending across the ingress/egress path of the passenger suite 300 to make contact with a front edge 324 of the static element 304. The height of the base 316 creates a gap between a lower surface of the door 405 and the floor portions 332, 334, such that the projection surface 330a is positioned underneath the lower surface of the door 405. In addition, the privacy panel 356 also includes a base 358 that has a height that is approximately equal to the height of the base 116 of the console 304.

In some examples, in response to receiving a control signal from a controller of a computing system, the projector within the interior of the console 304 can rotate such that the projection surface 330a for the graphical element 338 projected through the aperture 306a covers another surface within the aircraft suite 300. For example, the projector may be rotated in an upward direction such that the projection output through the aperture 306a is displayed onto a surface of a base 360 for the adjustable seat 314. In some implementations, the base 360 of the seat 314 may be used as the projection surface 330a for in instances where the door 405 to the suite 300 is in an open position, and the graphical element 330a provides information to a flight attendant passing through the aircraft cabin.

Figure 3B:
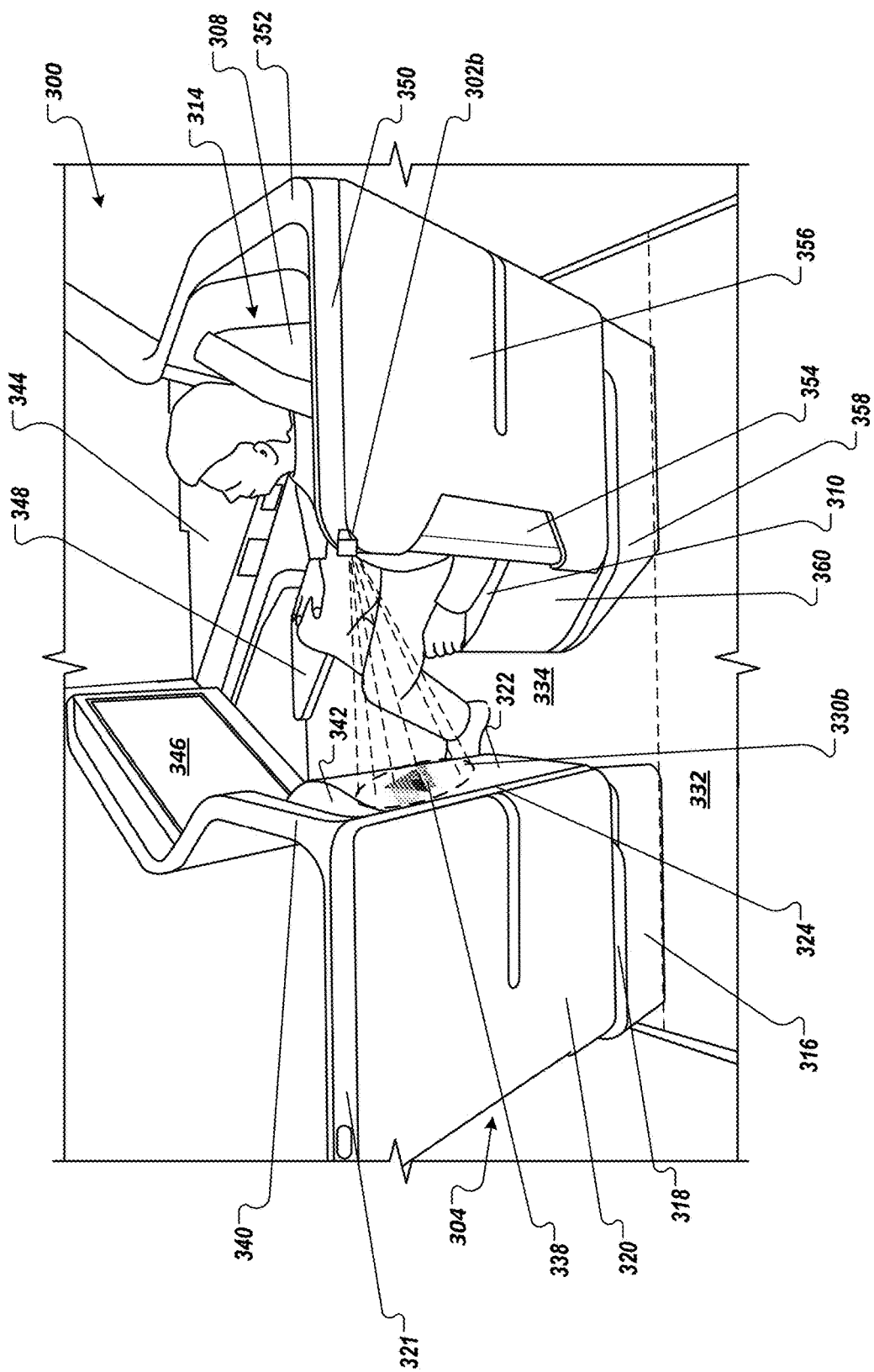

Turning to FIG. 3B, another location of the projection surface 330b and corresponding location for mounting of a projector 302b is shown. In some examples, the projector 302b may be mounted to the upper surface 350 of a rear aisle-side privacy panel 356 using the mounting assembly 200 (FIG. 2) described above and projects the graphical element 338 onto a projection area 330b on the front surface 320 of the console 304. In other implementations, the projector 302b may be installed within an interior of the privacy panel 356, which may include an aperture through which the graphical element 338 is projected onto the projection surface 330b. In some implementations, the front surface 320 of the console 304 may be used as the projection surface 330b for the graphical element 338 in instances where the graphical element 338 includes a personal message to the passenger or may be used to convey information between the passenger and flight attendant when the door 356 to the suite 300 is in an open position.

Figure 3C:
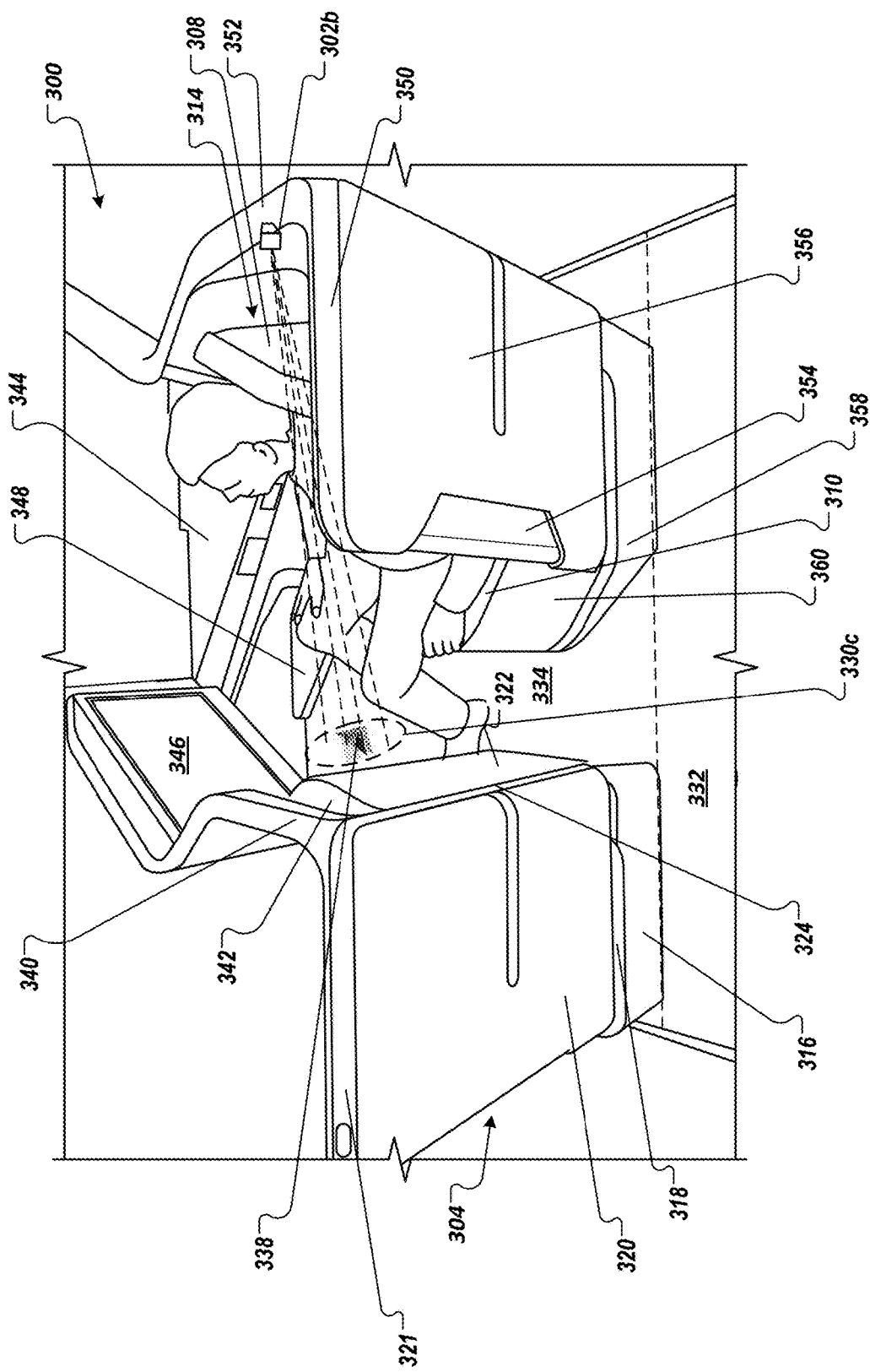
Figure 3D:
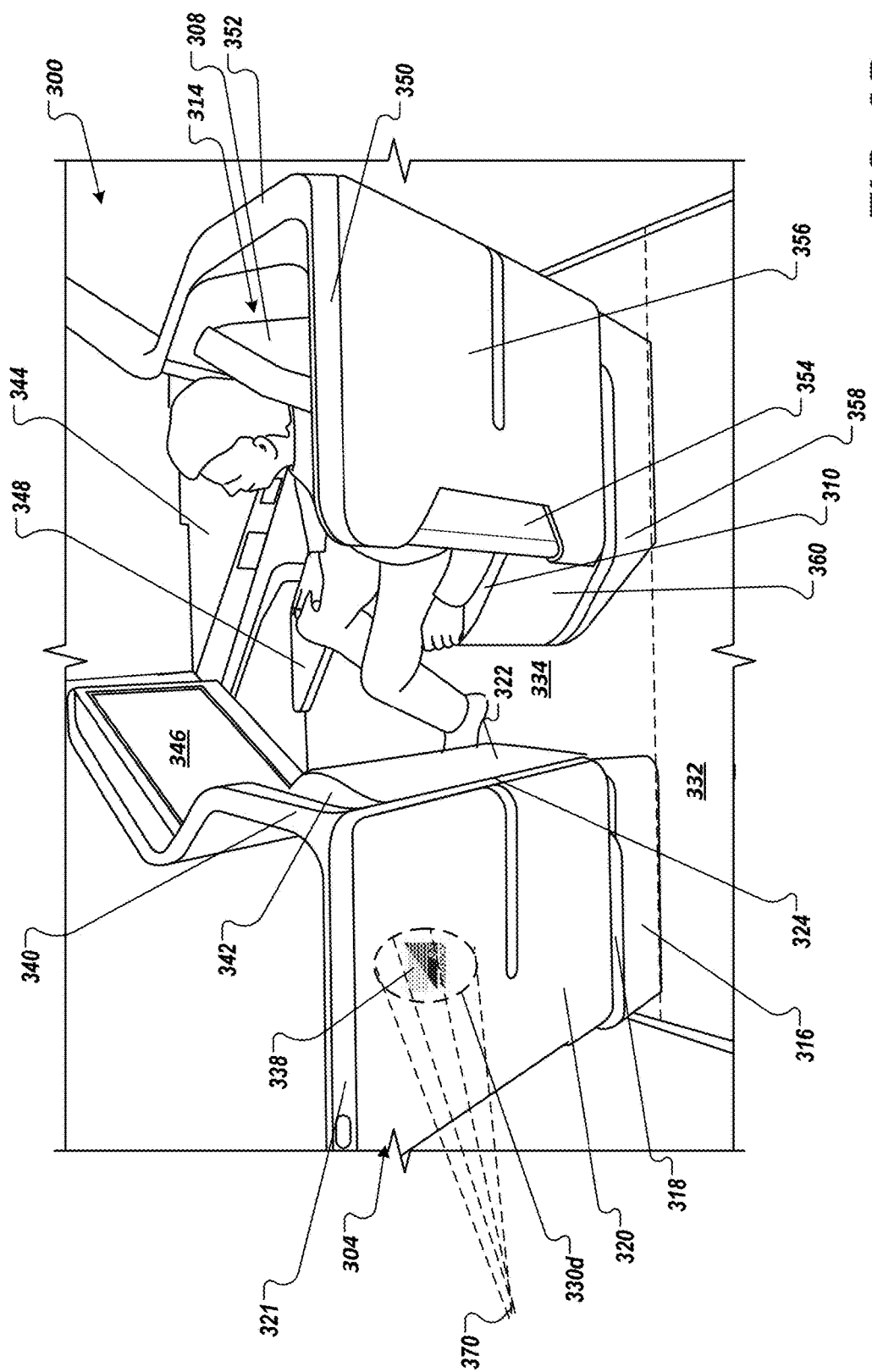

FIG. 3C illustrates another location of projection surface 330c and corresponding location for mounting projector 302c. In some examples, the projector 302c may be mounted to the surface of a rear partition wall 352 using the mounting assembly 200 (FIG. 2) described above and projects the graphical element 338 onto a projection area 330c onto the floor 334 of the suite 300 at the feet of the passenger. In examples where the suite 300 includes an ottoman, the projection surface 330 may be a surface of the ottoman. In other implementations, the projector 302c may be installed within an interior of the rear partition wall 352, which may include an aperture through which the graphical element 338 is projected onto the projection surface 330c. In some implementations, the floor 334 in front of the passenger may be used as the projection surface 330c for the graphical element 338 in instances where the graphical element 338 includes a personal message to the passenger and/or for communications with the passenger when the seat 114 is in an upright position.

FIG. 3D illustrates a location for the projection surface 330d for a projector location 370 that is outside the suite 300. In some examples, the projector location 370 may be a surface of an adjacent suite, a surface of a suite across an aisle from the suite 300, a surface of an overhead bin or other storage compartment, etc. In some implementations, the projector mounted to the location 370 outside the suite 300 may be configured to project a graphical element 338 onto a projection area 330d on an outer surface 320 of the console 304 that forms an aisle-side boundary of the suite 300. The outer surface 320 of the console 304 may be used as the projection surface for communications from the passenger to the flight attendant that may not necessitate a response from the flight attendant. For example, the graphical element 338 in the projection area 330d may display a "Do Not Disturb" icon that indicates to the flight attendant that the passenger does not wish to be disturbed in any non-emergency situations.

Figure 4:
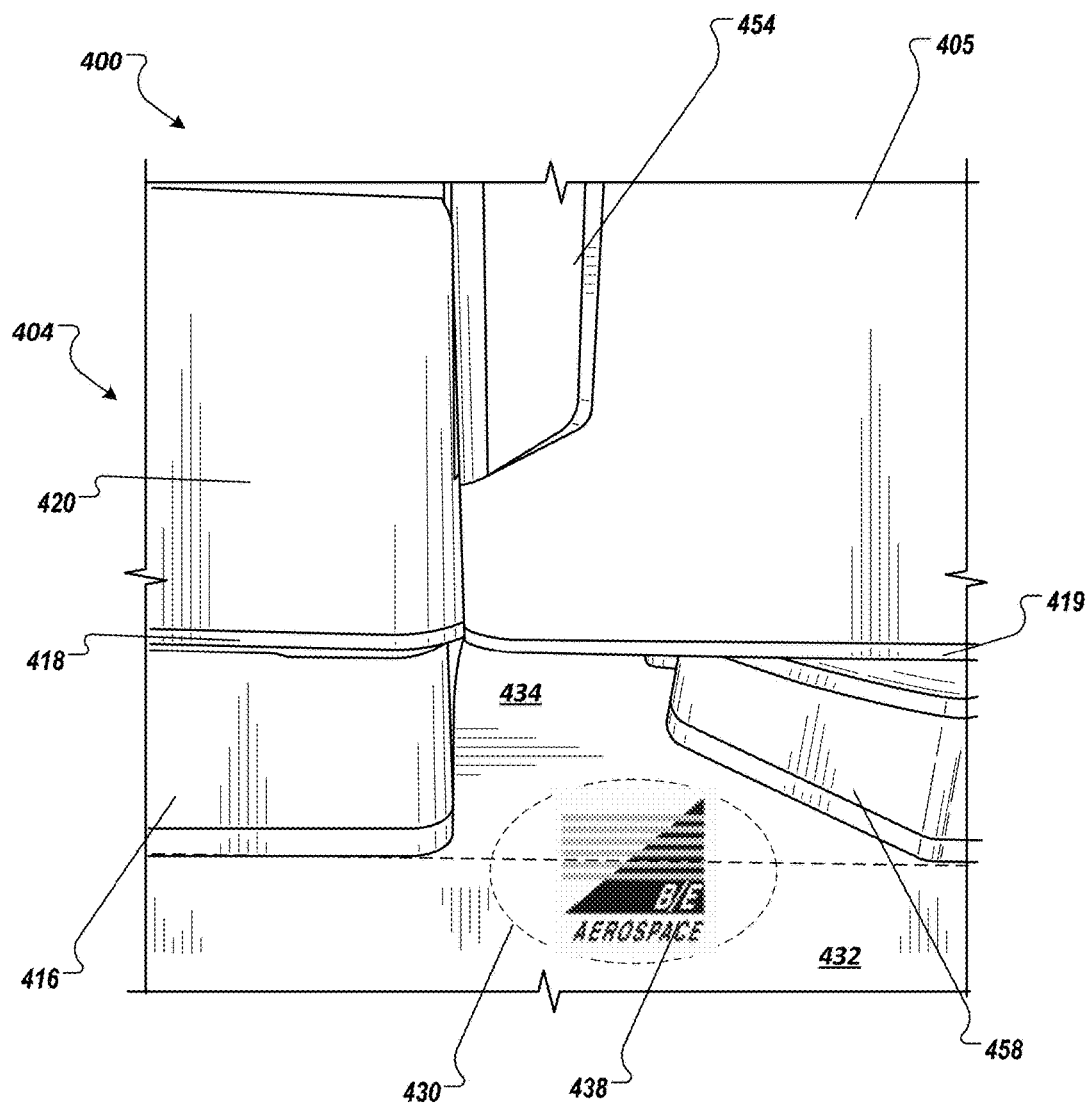
FIG. 4 illustrates a close-up aisle-side view of a door covering an ingress/egress path of a passenger suite.

Turning to FIG. 4, a zoomed in aisle-side perspective view of an ingress/egress path for an aircraft suite 400 is illustrated where a privacy door panel 405 to the suite 400 is in a closed position. The example illustrated in FIG. 4 corresponds to the example of FIG. 3A where the projector is mounted within an interior of the console 304 and projects the graphical element 338 onto the projection surface 330a that includes both the first and second floor portions 332, 334. In some implementations, when the door 405 is in the open position to provide an ingress/egress path to and from the passenger suite 400, the door 405 may be enclosed behind or within a rear aisle-side privacy panel 356 (FIG. 3) of the suite 400. When the door is moved to the closed position, a handle 454 of the door 405 is pulled toward a forward aisle-side console 404 of the suite 400 until a forward edge of the door 405 makes contact with a rear edge of the console 404. In addition, when the door 405 is in the closed position, an aperture 306a on a front surface 322 (FIG. 3A) of the console 404 may be behind the door 405 such that the aperture 306a may not be visible from the aisle outside the passenger suite.

In some examples, the console 404 may be mounted onto a base 416, which is in turn mounted to a floor surface where a first floor portion 434 of the passenger suite 400 meets a second floor portion 432 of an aisle of the aircraft cabin. In some implementations, a height of the base 416 of the console 404 may be designed such that a height of the lower surface 418 of the console 404 corresponds to a height of a lower surface of a door 405 (FIG. 4) that translates to a closed position by extending across the ingress/egress path of the passenger suite 400 to make contact with the front edge of the console 404. The height of the base 416 creates a gap between a lower surface of the door 405 and floor portions 432, 434, such that the projection surface 430 is positioned underneath the lower surface of the door 405. In addition, the privacy panel 356 also includes a base 458 that has a height that is approximately equal to the height of the base 416 of the console 404 such that a lower surface of the door 405 corresponds to a lower surface 418 of the console 404 when the door 405 is in the closed position. Including both the first and second floor portions 432, 434 within the projection surface 430 allows both the passenger and personnel within the aisle of the aircraft (e.g., flight attendants) to view the graphical element 438 displayed within the projection surface 430.

Projection

In some implementations, the projector 202 (FIG. 2) or any other implementation of the projector 202 described above is one part of a projection system that can be configured to display a graphical element such as graphical element 338 (FIG. 3) onto a projection surface 330 to aid in providing service to the passenger within the suite 300 by the flight crew, provide information about the flight or aircraft, maintain privacy, as well as facilitate networking. In an example, the graphical element 338 can be a projected message such as an instruction, a request, flight information, a notice (e.g., do not disturb), a status of lavatory occupancy, etc. In an example, the projection system can be configured to display a graphical element 338 displaying a preferred spoken language such that an appropriate flight crew member can service the passenger. In another example, the graphical element 338 can be a display of a unique passenger seat assignment such as a passenger name or a logo associated with the passenger such as their business/employer logo. As illustrated above, the graphical element 338 reads "B/E AEROSPACE", although any image can be projected including text, graphics, colors, blinking/flashing images, or combinations thereof.

In an illustration, the projection system can be configured to display a message selected by a passenger to cabin crew, such as requests for common items such as "coffee", "water", "snacks", or "pillow." In providing selectable messages, for example, international travelers may find it convenient to interface with a user screen in their native language, while the cabin attendants may find it beneficial to have clear indications of a foreign traveler's wishes without the need for an interpreter. Similarly, a cabin attendant may present important messages (e.g., "Your luggage will be at baggage carousel 3," "Your connecting flight has been delayed by one hour," etc.) in the native tongue of the international traveler without needing to speak a foreign language. Further, passengers with hearing difficulties or passengers with speech difficulties (e.g., laryngitis, etc.) may use the projection system to clearly indicate requests to cabin attendants, although any passenger may benefit from selecting messages for cabin attendant review so that a cabin attendant may fulfill the request without the need to interrupt the passenger.

In an aspect, the projection system can be configured to display an associated passenger's business/employer logo, which may in turn facilitate a networking opportunity between the passenger in the suite 300 and another passenger in another suite. In an example, the projection system can be configured to display a graphical element 338 based on at least a portion of a passenger's online networking profile such as LinkedIn™. Passengers traveling in business and/or first class are paying premium prices and may be doing so at their business/employer's expense. In an aspect, using the projection system to project a business passenger's association may provide an added incentive to fly in a premium cabin class (e.g., doing so provides some advertising benefit to the company).

In some implementations, a passenger may be offered to choose seat selection based on a passenger seat assignment associated with a particular business/employer. For instance, when a first passenger is assigned a seat, the passenger may be provided the opportunity to upload a logo. Alternatively, when a business passenger books travel with a corporate travel consultant, the consultant may associate a logo with all passengers booked under this particular logo. Upon uploading of a logo image, the logo image may be available to other passengers reviewing the seat selection user interface, for example through a software browser. A second passenger, seeing a particular logo, may wish to be seated near the passenger associated with the logo, for example to be positioned near a potential business partner. The air passage booking system may offer logo-based seat selections, in some embodiments, at a premium price. Similarly, a passenger may be offered to choose seat selection based on a passenger seat assignment associated with a particular social identifier. In an example, the graphical element 338 can be a trademarked image such as a favorite sports team.

The projection system, in some embodiments, may be used to present breaking news or other important information, such as an alert when the flight is twenty-five minutes from landing, local time and weather at the flight's destination, lost and found information (e.g., an earring was discovered in the fore lavatory) or baggage claim instructions for gate-checked luggage. In further examples, congratulatory messages may be presented within the projection surface 330 such as, in some examples, Happy Birthday, Just Married, or Thank You for Your Service.

In some implementations, the projection surface 330 within the passenger suite 300 can be configured to enhance reflection of the graphical element 338. For example, the cabin floor, which is typically made from a carpet material, can be made from any material configured to enhance reflectance of light used in the graphical element 338. In an example, the projection surface 330 on the cabin floor can be made from or coated with a rubber, plastic, and vinyl material.

In some implementations, the projection surface 330 includes printed markings, regions, or images on which the projector 202 displays a graphical element 338 in a coordinated manner. For example, the projection surface 330 can have a section printed or otherwise labeled with a forward and aft lavatory indicator. In this case, the projector 202 can be configured to display a respective lavatory occupation status in the respective projection surface 330 section.

In another example, the graphical element 338 can be configured to reflect off a reflective surface such as a mirror or glass. In this case, a direct line of sight to the projection surface 330 may not be required. However, depending upon position of the reflective surface, smudges or line of sight issues may inhibit reflection of projected information.

In some implementations, the suite 300 may be configured with more than one projector 202 so that multiple graphical elements in multiple locations can be displayed. For example, it may be necessary to display sitting position requirements during taxi, take-off and landing (TTOL) to the passenger in a more conspicuous and visible location than at the location of the projection surface 330*a* (FIG. 3A) to ensure that the passenger complies with an instruction in the graphical element 338. In other embodiments, the projector may be configured to rotate to a different projection surface depending, in some examples, upon direction of message (e.g., to cabin attendants vs. to the passenger), position of the cabin door, and/or position of the passenger (e.g., upright, reclined, or lie-flat). In still further implementations, messages from the passenger to the flight crew may be presented via the projection system, while return messages from the flight crew to the passenger may be presented elsewhere in the suite, such as in a scrolling message on the display of the monitor 346.

Passenger Status Sensing

In certain embodiments, in addition to outputting graphical elements onto projection surfaces of passenger suites in response to receiving requests from passengers and/or flight attendants, the projection system may automatically determine the status of a passenger (e.g., awake or asleep, inside or outside the passenger suite, eating a meal and/or drinking a beverage, finished with a meal and/or beverage, performing work activities such as typing on a laptop or writing on a notepad, or watching a movie) based on sensor data obtained by various types of sensors installed within the passenger suite that are configured to collect sensor data related to passenger activities. In some implementations, the projection system may determine a sensed status for the passenger by analyzing the sensor data collected by the sensors within the passenger suite and identifying particular activities performed by the patterns based on a comparison of the obtained sensor data with stored pattern data associated with the particular activities. In some examples, in response to determining the sensed status of the passenger, the projection system may automatically display a graphical element onto a projection surface that corresponds to the sensed status.

For example, if obtained sensor data indicates that the passenger has finished drinking a beverage based on pressure, temperature, and/or inertial sensors within a table for the working surface 344 detecting that an empty cup has been placed on the working surface 344 of the passenger suite 300, then the projection system may automatically output a graphical element 338 onto a projection surface 330 that indicates to the flight attendant that the cup is empty and the passenger may be ready for a refill or to have the empty cup picked up for disposal. The graphical element 338 may be a graphical icon of an empty cup or a message indicating that service may be needed at the passenger suite 300.

In another example, if obtained sensor data indicates that the passenger is sleeping based on sensor data obtained by pressure and/or contact sensors connected to actuators for the adjustable seat 314 indicating that the seat 314 is in the lie-flat position and/or motion sensors within the suite 300 indicating that the passenger has made significant movements for more than a threshold period of time, then the projection system may automatically output a graphical element 338 onto projection surface 330 indicating that the passenger is asleep and/or a message stating "Do Not Disturb."

In some implementations, the projection system can include motion sensors (not shown) installed within the passenger suite 300 and aircraft cabin that can be configured to activate a projection. For example, the projection system may be configured to operate in a standby mode where the graphical element 338 is configured to be turned off and woken up when a motion sensor detects a movement nearby. In this manner, messages to the passenger may be suppressed while the passenger is suspected to be sleeping. In another example, messages to flight attendants may be suppressed during periods of aisle inactivity. In detecting motion indicative of aisle traffic, in some embodiments, a motion detection system may be mounted upon or proximate an adjacent suite, or even two or more suites away, to alert the projection system of movement in the cabin region. In a particular embodiment, a single motion sensor or set of motion sensors (e.g., to identify both location and direction of travel) may provide signals to a number of surrounding passenger suites mounted upon the aisle. In another illustration, the motion detection system may identify absence of a passenger from the passenger suite. For example, a threshold motion detection trigger may indicate the passenger has vacated the suite, and the projection system may be disabled until the passenger has returned.

In certain embodiments, during emergency situations the projectors may be configured to project safety-related images. For instance, the projectors may project images guiding passengers to the nearest emergency exits. Alternatively, the projectors may project images instructing passengers to or demonstrating how to equip oneself with an emergency oxygen mask.

The projection system can also use other types of sensors than motion sensors to determine a status of the passenger within the suite 300 that may affect which projector location/projection surface combination is used to display the graphical element to the passenger and/or flight attendant. For example, the door 405 (FIG. 4) may include one or more contact sensors that provide an indication of whether the door 405 to the suite 300 is opened or closed. For example, if the door 405 is closed, then the projection surface 330*a* may be used to display the graphical element 338 to be viewed by both the passenger and flight attendant.

In addition, the suite 300 may include pressure sensors, inertial sensors, temperature sensors, and/or other types of sensors on or under various surfaces within the suite 300, such as the working surface 344 that detect when the passenger has placed an object on the those surfaces, indicating that the passenger may be awake and eating and/or working. In a particular example, the actuators for the seat 314 may include pressure and/or contact sensors that provide an indication of whether the seat 314 is in an upright or lie-flat position, which may indicate whether the passenger is awake or asleep. If the seat 314 is in the lie-flat position, then the projection surface 330*c* (FIG. 3C) may not be selected as the projection surface due to obstruction of the projection surface 330*c* by the seat 314 in the lie-flat position.

Figure 5A:
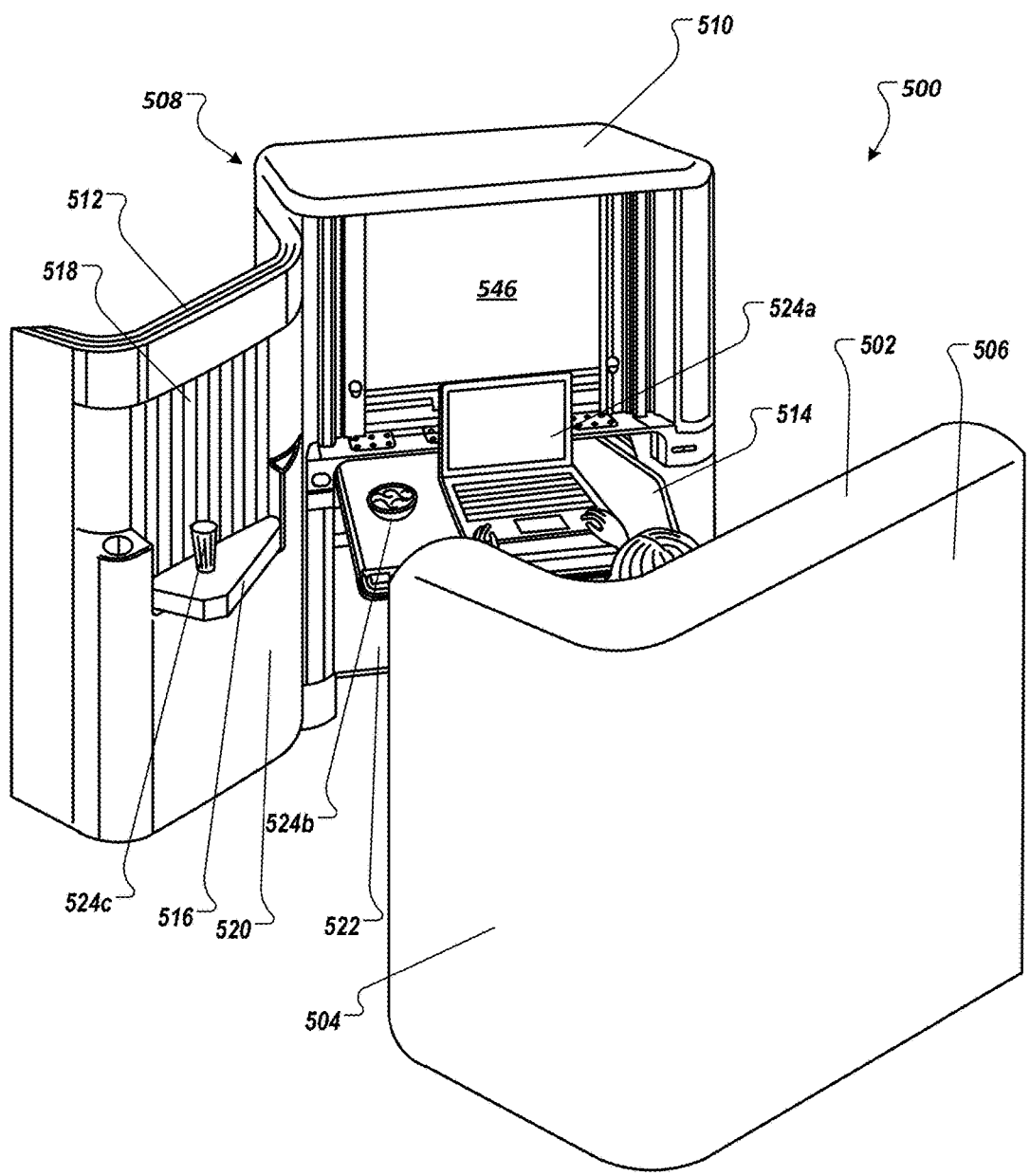
FIG. 5A illustrates a rear perspective view of a passenger suite including surfaces configured to detect passenger activity.
Figure 5B:
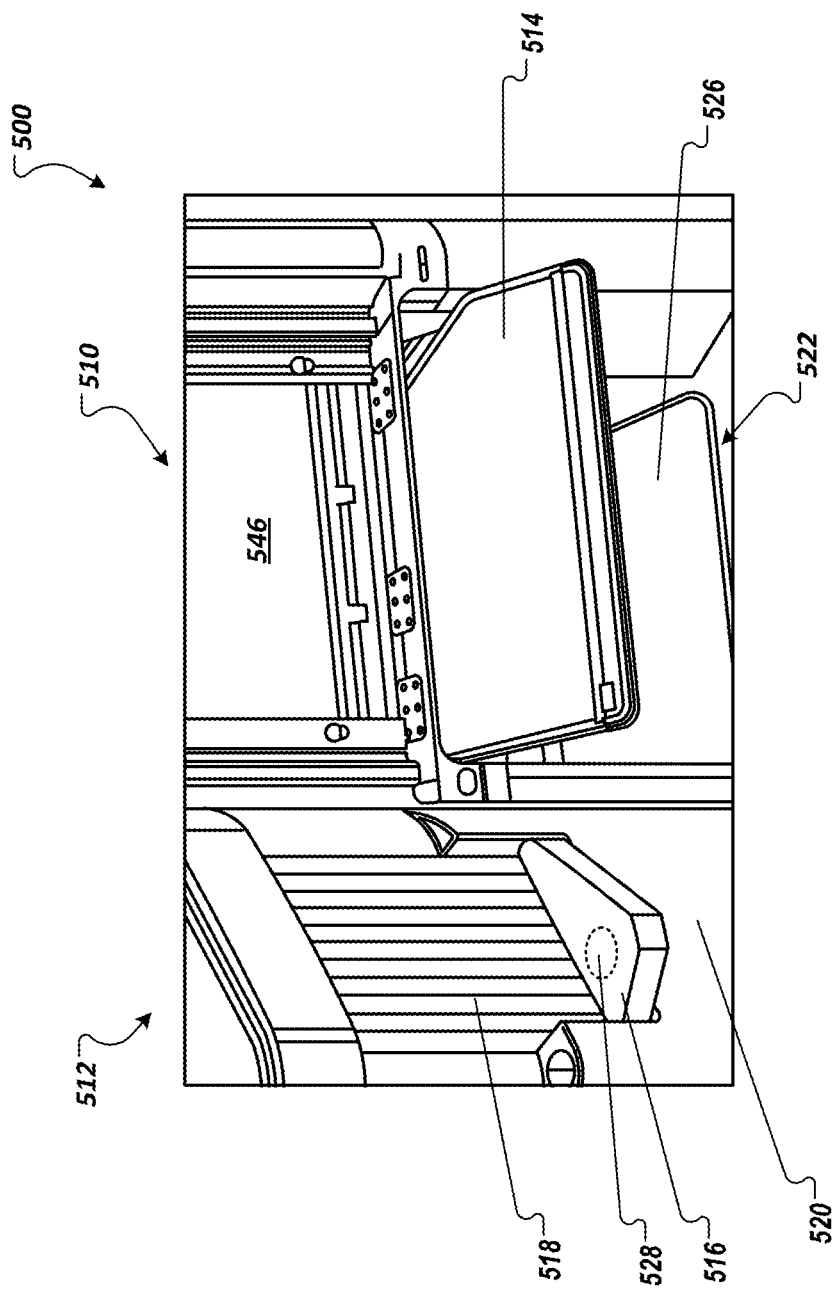
FIGS. 5B-5C illustrate zoomed in perspective views of surfaces within a passenger suite configured to detect passenger activity.
Figure 5C:
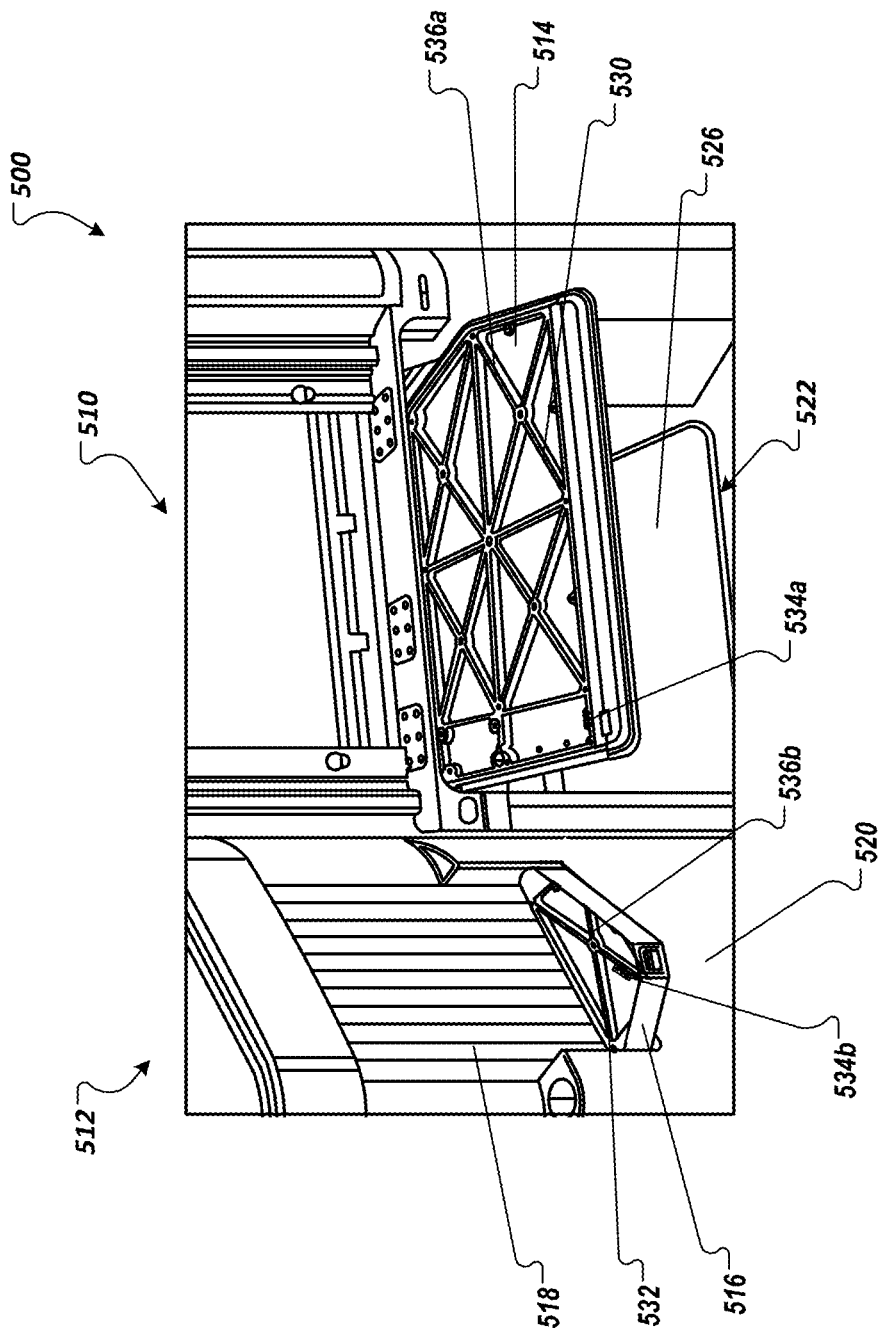

Turning to FIGS. 5A-5C, an alternate configuration of a passenger suite 500 is illustrated that includes sensors installed on, under, or within various surfaces of the suite 500 that can be utilized to detect various passenger activities with respect to those surfaces. The detected passenger activities may correspond to a sensed passenger status, which can be used to automatically project a graphical element onto a projection surface of the passenger suite based on the sensed passenger status. In addition, in certain embodiments, any of the features of the passenger suite 500 described below may also be included as features of the passenger suite 300 (FIG. 3) or any other passenger suite implementation described above.

As shown in FIGS. 5A-5C, the passenger suite 500 includes a seat 502 surrounded by a rear enclosure or shell forming partition walls that separate the suite 500 from the rest of the aircraft cabin. For example, the seat 502 may include a side partition wall 504 and a rear partition wall 506 integrated into the structure of the seat 502. The suite 500 may also include a forward enclosure portion 508 with various work surfaces and other components that the passenger may interact with. For example, the forward enclosure portion may include a forward partition wall 510 and a side partition wall 512 that form a boundary between the suite 500 and an adjacent suite or cabin space forward of the suite 500.

In some implementations, the forward partition wall 510 may include a monitor 546 built into an upper portion of the forward partition wall 510 that may function as an I/O device for making projection requests, watching movies or other programming, or viewing other information. The forward partition wall 510 may also include a lower portion 522 which may include storage compartments or an ottoman 526. In some examples, the forward partition wall 510 also includes a first table 514 that may be hingedly connected to the first partition wall below the monitor 546 such that the first table 514 is configured to rotate in an upward direction for stowage when not in use and/or for TTOL requirements. In some embodiments, when in a deployed position, the first table 514 may be directly in front of a passenger in the seat 502 and may function as a primary working surface for the passenger for various activities such as eating, drinking, using electronic devices such as laptops, tablets, or mobile devices, reading, or writing in notepads or journals.

In some examples, the side partition wall 512 may include an upper portion 518, a lower portion 520, and a second table 516 hingedly connected to a surface of the side partition wall 512 between the upper portion 518 and the lower portion 520 such that the second table 516 is configured to rotate in an upward direction for stowage when not in use and/or for TTOL requirements. In some implementations, the lower portion 520 may include a closet and/or other storage compartments. In some embodiments, when in a deployed position, the second table 516 may be adjacent to the first table 514 and offset from direct view of a passenger seated in the seat. The second table 516 may have a working (upper) surface that is smaller than a working surface of the first table 514, and in some examples, the second table 516 may function as a secondary working surface for the passenger. In some implementations, the second table 516 may be a bar table that is used primarily for placing food and/or drink items during use by the passenger when eating or drinking as well as when the passenger has finished eating or drinking and may desire a refill or that the items be cleared away by a flight attendant for disposal. For example, the system may be configured to detect that the passenger has placed an object at a predetermined location 528 on a working surface of the second table 516, indicating that the passenger wishes for the object to be cleared away by the flight attendant. The predetermined location 528 may be indicated by a marker or other indication on the working surface of the table 516. In response to detecting an object placed at the predetermined location 528, the system may project a graphical element onto the projection surface indicating to the flight attendant that the passenger would like an object to be cleared away from the suite 500 for disposal.

The forward partition wall 510 and/or first table 514 as well as the side partition wall 518 and second table 516 may include various sensors that can detect a position of the first table 514, which may be indicative of the passenger status. For example, portions of the forward partition wall 510 surrounding the monitor 546 may include contact sensors that are configured to detect contact when the first table 514 is rotated upward into a stowed position. Similarly, portions of the side partition wall 512 may include contact sensors that are configured to detect contact when the second table 516 is rotated upward into a stowed position. In addition, voids within an interior of the first table 514 and second table may include inertial sensors, such as accelerometers, that are configured to detect upward and downward rotation of the first and second tables 514, 516, which can be used to determine whether the first and second tables 514, 516 are in a deployed or stowed position. In some implementations, when it is detected that the first or second tables 514, 516 are stowed in the upright position indicating that the first or second tables 514, 516 are not in use, the projection system may be configured to suppress sensor data received from the sensors configured within, on, or below the first and second tables 514, 516 when determining the sensed passenger status.

In some examples, when the first and/or second tables 514, 516 are in the deployed position, the projection system may identify activities performed by the passenger with respect to the first or second tables 514, 516 that correspond the sensed status of the passenger based on sensor data received from sensors configured within, on, or below the first and second tables 514, 516. For example, the sensor data obtained by the sensors associated with the first and second tables 514, 516 may be used to detect and/or identify various types objects 524 placed on working surfaces of the first and second tables 514, 516 as well as activities associated with those objects.

FIG. 5C illustrates a zoomed in perspective view of the passenger suite 500 with the working surfaces for the first and second tables 514, 516 removed to reveal the interior components and structure of the first and second tables 514, 516 below the working surfaces. In some implementations, the first and second tables 514, 516 may include respective first and second sensor boards 530, 532 disposed in voids within the interior of the first and second tables 514, 516 that include multiple sensors 534 connected to the sensor boards 530, 532 and/or integrated into the structure of the sensor boards 530, 532. In some examples, the sensor boards 530, 532 may be affixed to one or more interior surfaces of the tables 514, 516, such as a lower interior surface, side surfaces, or upper interior surface. In some examples, the sensor boards 530, 532 have dimensions that corresponds to the dimensions of their respective tables 514, 516 such that the sensor boards 530, 532 may be configured to detect objects placed on the first and second tables 514, 516 and associated passenger activities across an entire working surface of the tables 514, 516.

In some implementations, the sensor boards 530, 532 include multiple slats 536 arranged at predetermined angles within the voids of the respective first and second tables 514, 516 to which the sensors 534 are connected. In some implementations, the slats 536 of a sensor board 530, 532 may intersect one another to form boundaries of detection regions that can be used to localize a detected object to a specific location on the tables 514, 516. In one example, the sensor boards 530, 532 may include both global and local sensors 534 that operate in a tiered fashion having varied sensitivities that are used to detect the locations of objects and types of objects placed on the tables 514, 516. For example, the tables 514, 516 may include a global inertial sensor that detects general movements, vibrations, or rotations of the tables 514, 516. The global inertial sensor may have a sensitivity that is less than the sensitivity of local inertial sensors dispersed across the sensor boards 530, 532. In some examples, when the global inertial sensor detects movement or vibration of the table 514 or 516, one or more local inertial sensors are activated in one or more regions of the sensor board 530 or 532 to obtain more precise sensor data from the more sensitive inertial sensors that can be used to identify the type of activity performed by the passenger at the table 514 or 516. Other types of sensors connected to the sensor boards 530, 532 may also include global and local sensors having varied sensitivities that may operate in the tiered fashion to localize a position of an object on the tables 514, 516, identify a type of object, and/or identify a type of interaction between the passenger and the object, which can be used to determine the status of the passenger within the suite.

The inertial sensors connected to the sensor boards 530, 532 can include any combination of multi-axis accelerometers, gyroscopes, and magnetometers that can be used to detect movement of the tables 514, 516, that may correspond to activities such as placing objects 524 onto or removing objects 524 from the working surface of the tables 514, 516, impact transmitted from a laptop keyboard through the laptop to the tables 514, 516, or manipulation of the tables 514, 516 themselves. These movements create vibrations, which may be detected by the sensor boards 530, 532 and translated into changes in acceleration in principal directions relative to the sensor boards 530, 532. In some implementations, accelerometers may be configured measure an amount of acceleration in a particular direction, gyroscopes may be configured to measure changes in orientation of relative velocity, and magnetometers measure changes in magnetic fields that can be used to determine absolute orientation of the tables 514, 516. Because accelerometers, gyroscopes, and magnetometers may be used to measure different features of inertial movement, the sensors may be combined into a single inertial measurement unit (IMU).

In some examples, the sensor boards 530, 532 may include other types of sensors 534 that are used to detect movement or contact with the tables 514, 516 that corresponds to various passenger activities. Other examples of position or motion detection sensors may include orientation sensors that provide information regarding position in comparison to a reference plane. Examples of orientation sensors include rotary encoders and inclinometers. A Hall effect sensor may be used to determine proximity to a magnetic field, which can be translated to a range of positions. In some implementations, the Hall effect sensor may be used to detect liquid spills on the working surfaces of the tables 514, 516 based on changes in the detect magnetic field due to the spilled liquid. Other proximity sensors include optical, capacitive, and inductive proximity sensors. In a simpler embodiment, a reed switch is opened or closed by a magnetic field, such that a binary position (e.g., in this orientation, not in this orientation) may be readily determined based upon a switch position. In another simple embodiment, an optical switch may be used to determine whether a beam of light has been broken, which can translate to whether the tables 514, 516 are in a particular position or not.

In some aspects, the sensor boards 530, 532 may also include sensors 534 that detect other types of changes with respect to the tables 514, 516 that can be used to detect types and locations of objects on the tables 514, 516. For example, pressure sensors, such as piezoresistive strain gauges, capacitive, or electromagnetic pressure sensors may be used to detect locations and sizes of objects placed on the surfaces of the tables 514, 516 based on variations in pressure that are detected across the surface of the tables 514, 516. In addition, temperature sensors such as resistance temperature detectors (RTDs) may be used to detect variations in temperature at various locations on the tables 514, 516 due to hot or cold objects being placed on the tables 514, 516 that may be used to detect types and locations of the objects 524 placed on the tables 514, 516. In some examples, the sensor boards 530, 532 may also include infrared (IR) sensors that may be configured to detect locations and sizes of objects placed on the tables due to detectable IR energy that is generated by the objects placed on the tables 514, 516. In some examples, an electronic IR signature generated by an object can be used to identify a size and shape of the object.

In some implementations, in addition the sensor boards 530, 532, the working surfaces of the tables 514, 516 may also include integrated touch-sensitive panels that are configured to generate electrical signals in response to objects being placed in contact with a touch-sensitive surface. The touch-sensitive panels that are integrated into the working surface of the tables 514, 516 may use resistive, capacitive, or surface acoustic wave touch sensing technologies. The types of sensors described herein with respect to the tables 514, 516 are not meant to be limiting, and other types of sensors configured to detect movement of the tables 514, 516 and/or types and locations of objects placed on the tables may also be used.

Figure 6:
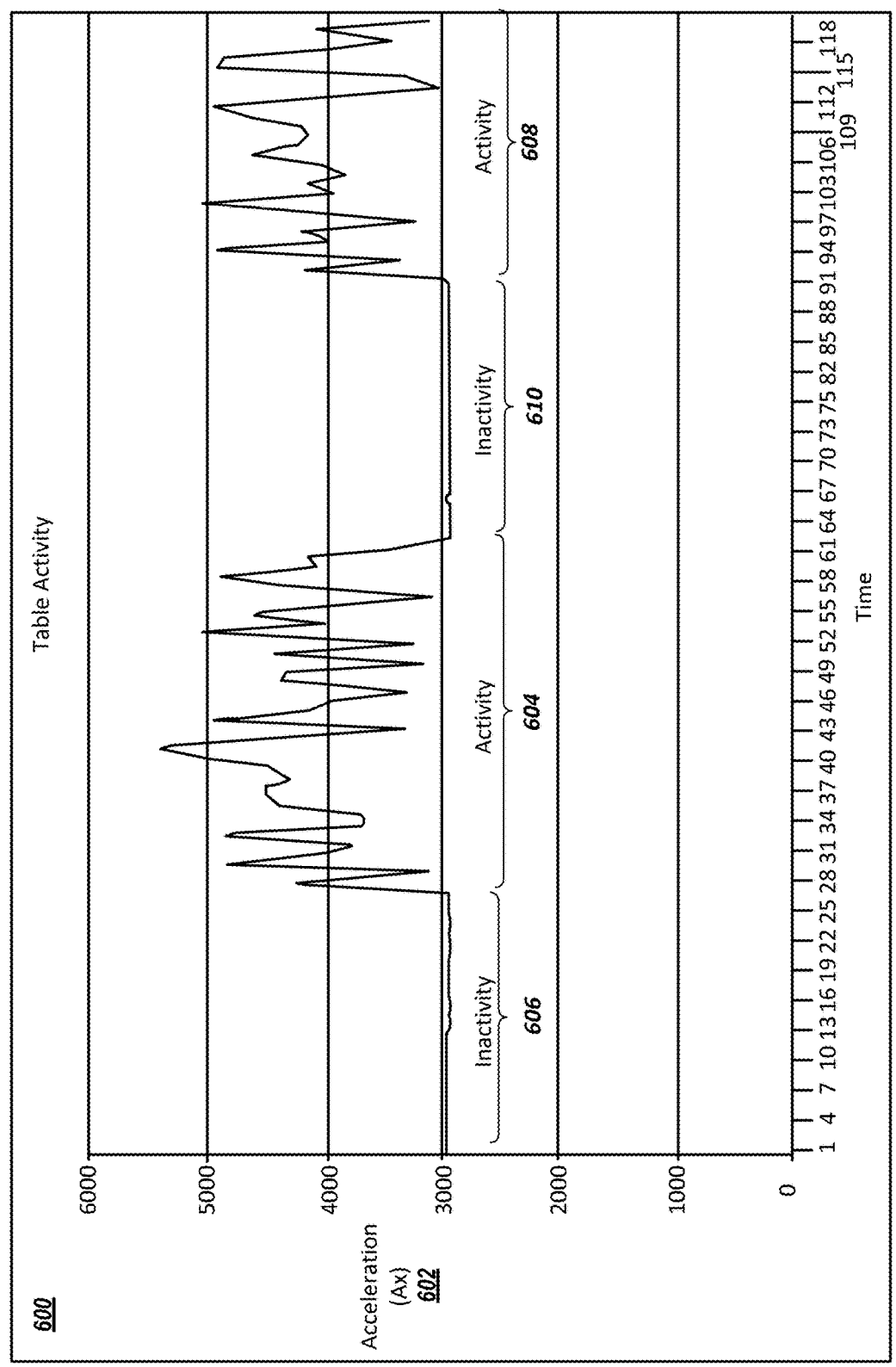
FIG. 6 illustrates an exemplary graph of sensor data from a sensor device configured to detect passenger activity.

In some implementations, a frequency with which the sensors 534 detect activity correlates to level or amount of activity at the tables 514, 516. For example, a period of many successive changes in acceleration greater than a threshold value for an accelerometer may indicate activity, while periods of no sensed changes or few sensed changes may indicate inactivity. For example, FIG. 6 depicts an acceleration graph illustrating exemplary acceleration detected by an accelerometer connected to a sensor board 530, 532 of one of the tables 514, 516 over time. A table acceleration graph 600 includes an accelerometer sensor output 602 as a function of time. The graph 600 illustrates an example of the sensed accelerometer data, which may be used to detect an amount or type of activity at the table 514 or 516. Regions of high acceleration magnitude and/or fluctuation 604, 608 may indicate periods of activity while regions of low acceleration and/or fluctuation 606, 610 may indicate periods of inactivity.

In some implementations, the patterns of acceleration magnitude and fluctuation in the activity regions 604, 608 may correspond to various types of activities, such as vibrations associated with typing on a keyboard, turning the page of a book, or placing a cup on the table 514 or 516. In addition, combined regions 604-610 of activity and inactivity may also be indicative of various types of activities. For example, successive periods of detect activity followed by inactivity where the regions of inactivity 606, 610 lasting less than a threshold period of time may be indicative of a person lifting a cup off the table 514 or 516, taking a drink from the cup, and then placing the cup back on the table 514 or 516 where the activity regions 604, 608 correspond to the cup being picked up or placed on the table, and the inactivity regions 606, 610 correspond to times when the passenger is drinking from the cup or the cup resting on the table 514, 516. A period of inactivity greater than a threshold period of following the successive activity and inactivity regions 804-810 may be indicative of the passenger having finished the drink in the cup, and the projection system may output a graphical display onto a projection surface indicating to the flight attendant that the passenger has finished the drink and may like a refill or for the cup to be cleared away for disposal.

In some implementations, changes in magnitude of the acceleration that are detected when a cup is placed on the table 514 or 516 may provide an indication that the passenger has finished the drink in the cup. For example, when the cup is substantially full, the magnitude of acceleration of the table 514 or 516 when the cup is placed on the working surface of the table 514 or 516 is greater than the magnitude of the acceleration when a substantially empty cup is placed on the table 514 or 516. In some aspects, when the magnitude of acceleration change when the cup is less than a threshold value, the system may determine that the cup is substantially empty and project a graphical element onto a projection surface indicating to the flight attendant that the passenger has a drink to be refilled or cleared away for disposal.

In some implementations, periods of turbulence or other randomized movement of the aircraft cabin may result in movement of the tables 514, 516 that may result in activity detection by the projection system based on the obtained sensor data. In some examples, the system can filter out this randomized movement of the tables 514, 516 to prevent false activity detections by correlating the obtained sensor data associated with the randomized movement of the tables with sensor data obtained from tables of other passenger suites throughout the cabin that would have also experienced similar randomized table movement at approximately the same times. In some examples, the obtained sensor data 514, 516 that is correlated with sensor data of one or more tables in other suites indicating randomized movement due to turbulence or some other aircraft movement may be disregarded when determining the activities performed by the passenger at the tables 514, 516.

In some implementations, pattern data associated with specific sensed passenger statuses and detectable activities may be stored in memory of a computing device associated with the projection system. For example, the pattern data may include patterns of sensor data based on absolute and relative values, magnitudes, frequencies of detection over various periods of time, and the like, for sensor data obtained from the sensors 534 connected to the sensor boards 530, 532 within the voids of the first and second tables 514, 516 of the passenger suite 500 (FIGS. 5A-5C). In some implementations, the pattern data may also include correlations between different types of sensor data obtained from different types of sensors associated with a particular activity. For example, detection of a passenger working at a laptop may be detect based on a combination of detected vibrations associated with keyboard activity along with data from an IR sensor, pressure, sensor, touch sensor, or Hall effect sensor integrated into the working surface that indicates a shape of a laptop resting on the table 514 or 516.

In some implementations, the projection system may determine a sensed status for the passenger by analyzing the sensor data collected by the sensors within the passenger suite and identifying particular activities performed by the patterns based on a comparison of the obtained sensor data with the stored pattern data associated with the particular activities. In some examples, in response to determining the sensed status of the passenger, the projection system may automatically display a graphical element onto a projection surface that corresponds to the sensed status.

Computing System

In some implementations, the projector 202 may have an integrated computing system configured to send/receive instructions and process commands for projecting a graphical element onto a projection surface. In other implementations, the projector 202 may communicate with onboard computers such as a headend computer, a personal infotainment system, a mobile device, or other processing circuitry on board the aircraft. The processing circuitry, for example, may be a controller, electronic sensors and components of the passenger suite 300, a passenger seating grouping, or cabin region. In another example, the processing circuitry may be provided as part of an aircraft main computing system. Input/output communications may be wired or wirelessly received/transmitted to the projector 202. In some implementations, at least a portion of the processing circuitry is local to the projector. In an example, the processing circuitry can be a mobile device operating an app configured to send at least a portion of information used in the projection. In some implementations, the processing circuitry can include a server on the aircraft or remote to the aircraft.

Figure 7:
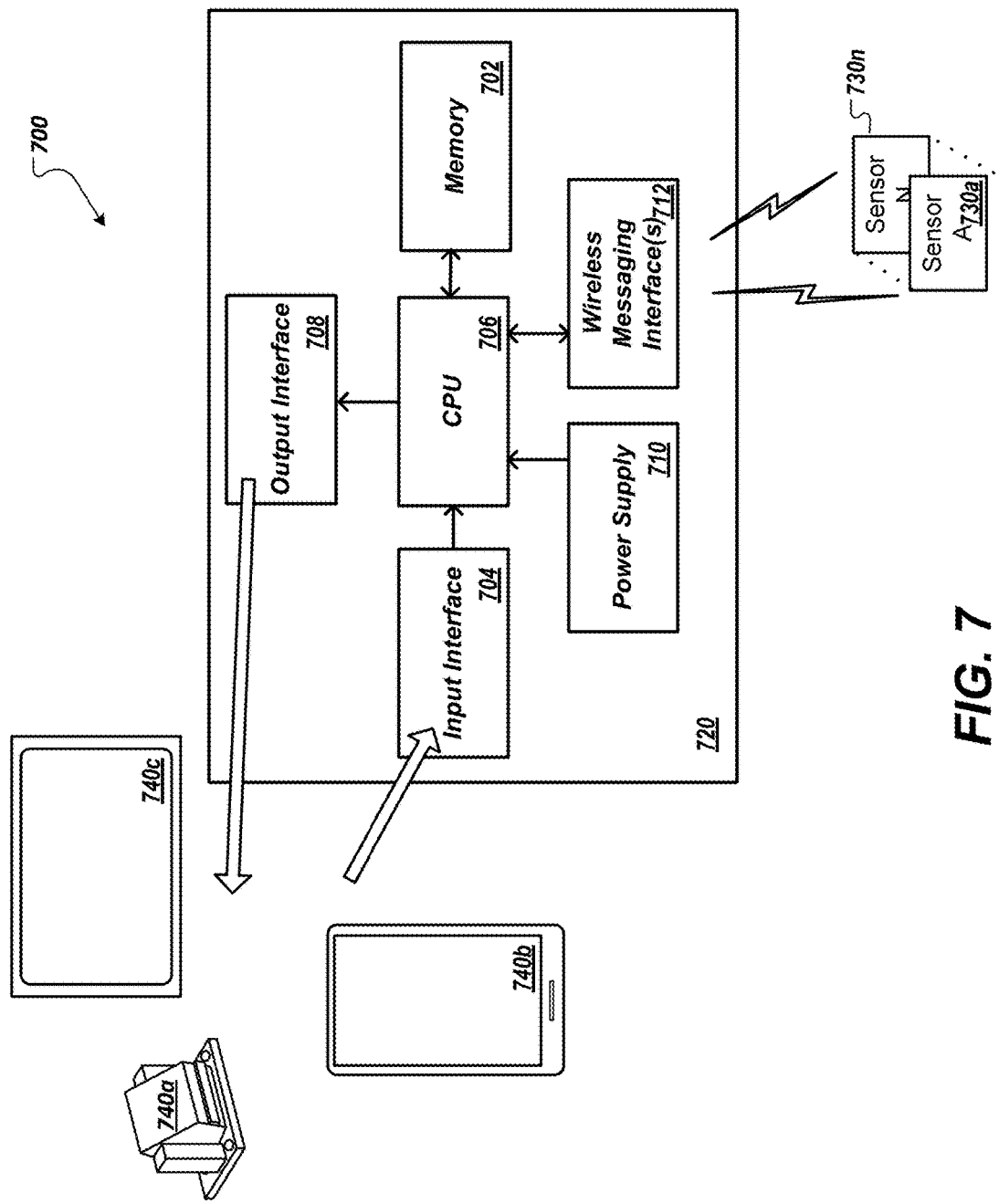
FIG. 7 illustrates a simplified block diagram for a computing system for controlling projection of a graphical element onto a projection surface by a projector.

For example, FIG. 7 provides a simplified hardware block diagram of control circuitry 720 of a projection system 700. The description of the control circuitry 720 is not meant to be limiting, and can include other components than those described herein. References to control circuitry 720 relate to the circuitry of one or more processing circuits, which can also be referred to interchangeably as processing circuitry. The control circuitry 720 may include a central processing unit (CPU) 706 that executes one or more software processes associated with the system 700. Software instructions for the processes can be stored in memory 702. The memory 702 can include both volatile and non-volatile memory and can store various types of data associated with executing the processes related to collecting projection requests from I/O devices that may include personal electronic device(s) 740*b* and/or console displays 740*c* for passengers and/or flight attendants, processing sensor data received from a number of sensors 730*a* through 730*n*, and outputting graphical element data to projector(s) 740*a* along with projection movement control signals based on the received requests and sensor data. In some implementations, the sensors 730*a* through 730*n* may also include the sensors 534 integrated into the sensor boards 530, 532 of the first and second tables 514, 516 that are used to identify activities performed by the passenger with respect to the first and second tables 514, 516 (FIGS. 5A-5C).

The control circuitry 720 includes an input interface 704 for communicating with various devices 740 that provide configuration and settings inputs to the control circuitry 720 such as projector(s) 740*a*, personal electronic device(s) 740*b*, and console display(s) 740*c*. and any other device associated with the system 700. The control circuitry 720 also includes an output interface 708 for connecting and providing information to devices 740 communicating with the control circuitry 720 including the projector(s) 740*a*, personal electronic device(s) 740*b*, and console display(s) 740*c*, and any other device communicating with the control circuitry 720. The control circuitry 720 also includes a power supply 710, such as a battery connection or wired connection to an electrical power source within the aircraft cabin. Further, the control circuitry 720 includes one or more communication interfaces 712, which may include wireless messaging interfaces, that enable the control circuitry 720 to collect sensor signals supplied by the sensors 730.

In some implementations, the control circuitry 720 may be configured to transmit a service request received from a passenger to a remote controller for a flight crew display based on sensor data received from the sensor boards 530, 532 of the tables 514, 516. The remote controller may cause the service request to be presented to the flight attendant on a personal electronic device 740*b* and/or console display 740*c*. For example, in response to detecting that the passenger has placed an object at location 528 on table 516, the control circuitry 720 may cause a remote controller for the flight crew display to output a service request to the personal electronic device 740*b* and/or console display 740*c* of the flight attendant. In some implementations, the remote controller for the flight crew display may communicate directly with a controller for a passenger suite to receive service requests, sensor data, and other passenger status information.

In some implementations, the memory 702 of the control circuitry 720 includes instructions for executing one or more engines or modules that perform processes associated with collecting and interpreting messages provided by the sensors 730 and communicating information regarding the sensor system to the devices 740. In some implementations, pattern data associated with specific sensed passenger statuses and detectable activities may be stored in the memory 702 of the control circuitry 720. For example, the pattern data may include patterns of sensor data based on absolute and relative values, magnitudes, frequencies of detection over various periods of time, and the like, for sensor data obtained from the sensors 534 connected to the sensor boards 530, 532 within the voids of the first and second tables 514, 516 of the passenger suite 500 (FIGS. 5A-5C). In some implementations, the pattern data may also include correlations between different types of sensor data obtained from different types of sensors associated with a particular activity. For example, detection of a passenger working at a laptop may be detect based on a combination of detected vibrations associated with keyboard activity along with data from an IR sensor, pressure, sensor, touch sensor, Hall effect sensor, or any other sensor integrated into the working surface that indicates a shape of a laptop resting on the table 514 or 516.

In some implementations, short range wireless communication is provided through Bluetooth wireless communication technology. In other embodiments, Ultra Wide Band (UWB) or ZigBee wireless communications may be used. The type of wireless communication technology that is used for the implementations described herein can be based on various factors that can include battery life, data usage, security and/or line-of-sight restrictions, and other concerns. In some embodiments, ZigBee or Bluetooth wireless communications may be used in applications where link security is prioritized. In other embodiments where frequency interference is a concern, Bluetooth or UWB communications may be used since both technologies use adaptive frequency hopping to avoid channel collision. In embodiments where a total of frequency channels is prioritized, Bluetooth wireless communications may be used.

User Interface

In some implementations, the projection system 700 provides selectable messages for passengers and flight attendants at a user interface screens at the personal electronic device(s) 740*b*, and console display(s) 740*c* that are subsequently displayed as graphical elements on projection surfaces by a projector. For example, the user interface screens can be configured to display messages selected by a passenger to cabin crew, such as requests for common items such as "coffee", "water", "snacks", or "pillow." In providing selectable messages, for example, international travelers may find it convenient to interface with a user screen in their native language, while the cabin attendants may find it beneficial to have clear indications of a foreign traveler's wishes without the need for an interpreter. Similarly, a cabin attendant may present important messages (e.g., "Your luggage will be at baggage carousel 3," "Your connecting flight has been delayed by one hour," etc.) in the native tongue of the international traveler without needing to speak a foreign language.

Figure 8:
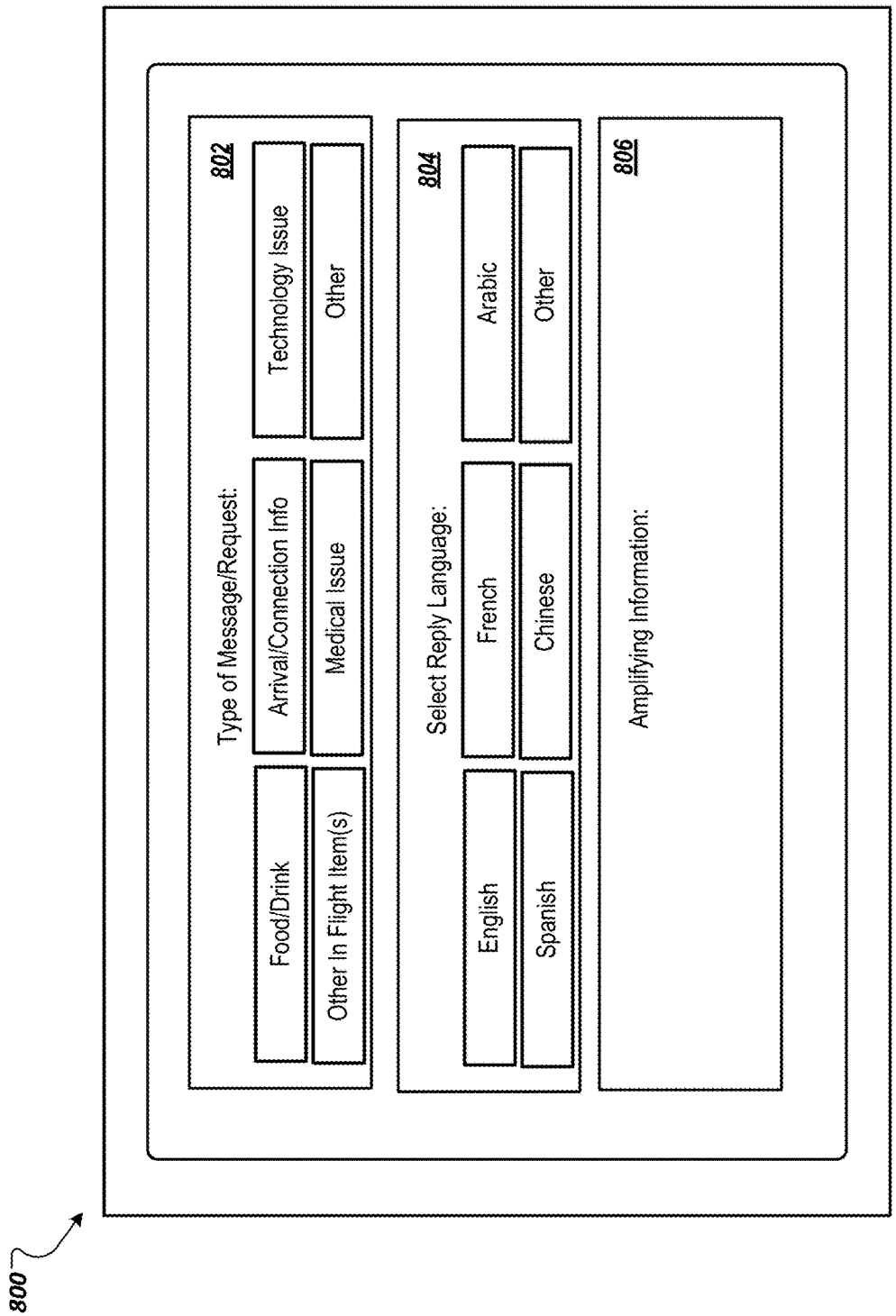
FIG. 8 illustrates a user interface screen provided to a computing device for initiating a projection request.

FIG. 8 illustrates an exemplary user interface screen 800 provided to the personal electronic device(s) 740b, and console display(s) 740c of a passenger for initiating a request or providing information to the flight attendant via the projection system 700. The user interface screen 800 includes various selectable and free text fields that allow the passenger to provide information or indicate a request. In some implementations, the user interface screen 800 may include a type of request field 802 that allows the passenger to select a type of request or message to send via a graphical element displayed by a projector(s) 740a of the projection system 700. If the user selects "arrival/connection info" at the request field 802, a subsequent user interface screen may request additional information from the passenger regarding connecting flights and/or display flight connection or arrival information on the screen. The user interface screen 800 may also include a native language selection field 804 where the passenger can indicate a language for the reply from the flight attendant that is displayed on the projection surface of the aircraft cabin. In some examples, the user interface screen 800 also includes an amplifying information field 806 where the passenger can indicate additional details of the request in free text format.

Projecting a Graphical Element onto a Surface of a Passenger Suite

Figure 9:
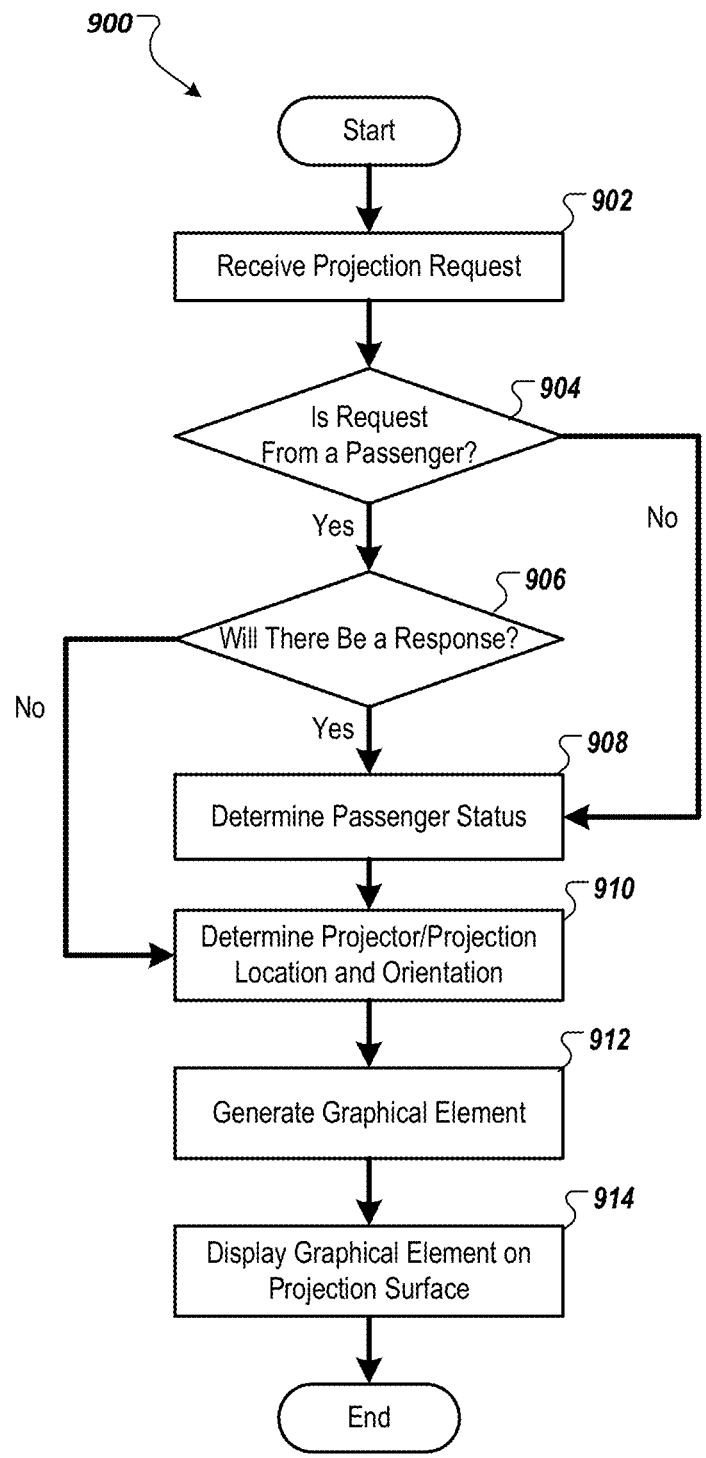
FIG. 9 illustrates a flow diagram of a method for controlling a projection system to project a graphical element onto a projection surface of an aircraft cabin.

Turning to FIG. 9, a method 900 for controlling a projection system to project a graphical element onto a projection surface of an aircraft cabin is illustrated. While the flow diagram illustrates an ordering of steps or blocks of the method 900, it can be understood that the various steps and processes associated with the method 900 can be performed in any order, in series, or in parallel. In some implementations, the method 900 begins with receiving a projection request (902) from a device connected to the projection system 700 (FIG. 7), such as the personal electronic device(s) 740b, and console display(s) 740c of a passenger and/or flight attendant.

In some implementations, the projection system 700 may also automatically generate a projection request without any interaction with the passenger or flight attendant that corresponds to a sensed passenger status determined by the system 700. For example, the system 700 may automatically determine the status of a passenger (e.g., awake or asleep, inside or outside the passenger suite, eating a meal and/or drinking a beverage, finished with a meal and/or beverage, performing work activities such as typing on a laptop or writing on a notepad, or watching a movie) based on sensor data obtained by various types of sensors installed within the passenger suite that are configured to collect sensor data related to passenger activities. In some implementations, the projection system may determine a sensed status for the passenger by analyzing the sensor data collected by the sensors within the passenger suite and identifying particular activities performed by the patterns based on a comparison of the obtained sensor data with stored pattern data associated with the particular activities. In some examples, in response to determining the sensed status of the passenger, the projection system may automatically display a graphical element onto a projection surface that corresponds to the sensed status.

In some examples, if the request is generated by the flight attendant or other non-passenger or by the system 700 in response to a sensed passenger status (904), or if in another example, a request or message generated by the passenger necessitates a response by the flight attendant for viewing by the passenger (906), then a status of the passenger is determined (908) in order to identify a projector/projection surface combination to use for displaying the graphical element onto the projection surface for the passenger to see within the passenger suite. If, in some implementations, however, the request is initiated by the passenger and does not necessitate a response by the flight attendant, then the status of the passenger does not need to be taken into account when selecting the projector/projection surface combination.

In some implementations, the status of the passenger within the suite can be determined based on sensor data received from various sensors described above within the passenger suite as well as other indicators received from the passenger via the projection system 700. For example, the status of the passenger can include whether the passenger is awake, asleep, not to be disturbed, etc. and can also include a status of the seat (e.g., upright, reclined, lie-flat) and a status of a door to the suite (e.g., open, closed). In some implementations, the status of the passenger may be determined based on sensor data received from tables that may include sensor boards embedded within interior voids of the table with sensors that provide an indication of how the passenger is interacting with the tables, which may include activities such as eating, drinking, typing on a laptop, reading a book or magazine, or writing on a notepad.

In some implementations, a projector/projection location and orientation angle for the projector may be determined based on the status of the passenger and components within the passenger suite (910). For example, as shown in FIGS. 3A-3D and FIG. 4, the projector mounted within the interior of the console 304 that projects the graphical element 338 through aperture 306a onto projection area 330a that includes both the first and second floor portions 332, 334 can be used for communications between the passenger within the suite 300 and the flight attendant when a door 405 (FIG. 4) is closed across an ingress/egress path of the suite 300 and/or for communications that are of interest to both the flight attendants and the passenger, such as requests for service from the passenger and acknowledgements of requests for service from the flight attendant.

In some implementations, the front surface 320 of the console 304 may be used as the projection surface 330b for the graphical element 338 in instances where the graphical element 338 includes a personal message to the passenger or may be used to convey information between the passenger and flight attendant when the door 356 to the suite 300 is in an open position. In some implementations, the floor 334 in front of the passenger may be used as the projection surface 330c for the graphical element 338 in instances where the graphical element 338 includes a personal message to the passenger and/or for communications with the passenger when the seat 114 is in an upright position.

The outer surface 320 of the console 304 may be used as the projection surface for communications from the passenger to the flight attendant that may not necessitate a response from the flight attendant. For example, the graphical element 338 in the projection area 330d may display a "Do Not Disturb" icon that indicates to the flight attendant that the passenger does not wish to be disturbed in any non-emergency situations.

In some implementations, the graphical element to be displayed on the projection surface is generated based on the type of received request as well as other factors such as a native language of a flight attendant and/or passenger (912) and displayed on the selected projection surface by the corresponding projector. In an example, the graphical element can be a projected message such as an instruction, a request, flight information, a notice (e.g., do not disturb), a status of lavatory occupancy, etc.

While the projection system has been demonstrated herein including a projector configured to display a projection on the cabin floor, there are numerous other ways in which the invention can be implemented to leverage different materials, finished, graphic projection elements and structure to create effects for product differentiation. Therefore, while certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for projecting a graphical element onto an interior surface of an aircraft cabin comprising:
   a passenger suite comprising partitions walls and a suite entrance between the partition walls;
   a projector mounted to a surface of one of the partition walls, the projector configured to output the graphical element onto a projection surface visible at the suite entrance;
   one or more sensors disposed in the passenger suite operable for sensing the presence or absence of a passenger within the passenger suite; and
   a controller communicatively coupled to the projector and including control circuitry configured to
      receive a projection request from a computing device indicating a graphical element for display onto the projection surface,
      determine the presence or absence of a passenger within the passenger suite based on sensor data received from the one or more sensors, and
      cause display or suppression of the graphical element onto the projection surface responsive to the sensed presence or absence, respectively, of a passenger within the passenger suite,
      wherein the display of the graphical element by the projector onto the projection surface is based on at least one of a type of graphical element associated with the received projection request, a native language of a passenger in the passenger suite, and a native language of the flight crew.

2. The system of claim 1, wherein the projection request is provided to the controller by the passenger via a computing device disposed within the passenger suite or within an adjacent passenger suite.

3. The system of claim 1, wherein the projection surface comprises a floor area at the suite entrance.

4. The system of claim 1, wherein the projection request is provided to the controller by flight crew via a remote computing device.

5. The system of claim 1, wherein a type of the graphical element corresponds to a type of communication message between the passenger and the flight crew, wherein types of communication messages comprise a food or drink request, connection information, a technology issue, and a medical issue.

6. The system of claim 1, wherein the projection request comprises textual input, and the controller is configured to translate the textual input into the graphical element comprising a native language of an intended recipient.

7. The system of claim 1, wherein the projection request is initiated by the passenger.

8. The system of claim 1, wherein the projector is mounted to one of the partition walls adjacent the suite entrance.

9. The system of claim 1, wherein the projection surface comprises an aisle adjacent the suite entrance.

10. A passenger suite for an aircraft cabin, comprising:
    partition walls and a suite entrance between the partition walls;
    a primary table;
    a secondary table disposed laterally adjacent the primary table;
    a first activity sensor embedded in the primary table;
    a second activity sensor embedded in the secondary table;
    a projector mounted to a surface of one of the partition walls, the projector configured to output a graphical element onto a projection surface visible at the suite entrance; and
    a controller communicatively coupled to the projector and including control circuitry configured to determine a status of the passenger within the passenger suite of the aircraft cabin based on data received from the first activity sensor and the second activity sensor, and in response to the determined status transmit a service request to a remote flight crew display controller based on data from the first activity sensor and data from the second activity sensor, and cause the projector to project or suppress the display of the graphical element based on a positional status of one or more of the primary and secondary tables.

11. The system of claim 10, wherein the controller is configured to continuously monitor passenger activity during at least a portion of a flight.

12. The system of claim 10, wherein the first activity sensor or the second activity sensor provides data concerning acceleration magnitude.

13. The system of claim 10, wherein the controller is further configured to receive a projection request from a computing device indicating a graphical element for display onto the projection surface, and cause display of the graphical element by the projector onto the projection surface based on at least one of a type of graphical element associated with the received projection request, a native language of a passenger of the aircraft passenger suite, and a native language of the flight crew.

14. The system of claim 10, wherein the controller is configured to cause the projection of an image associated with an activity state of the passenger.

15. The system of claim 14, wherein the controller is configured to select the image to project from an array of images based on the activity state of the passenger.

16. The system of claim 15, wherein the image is a moving image comprising an animation or movie.

17. The system of claim 10, wherein the projector is mounted to one of the partition walls adjacent the suite entrance.

18. The system of claim 10, wherein the projection surface comprise an aisle adjacent the suite entrance.

* * * * *